United States Patent
Tanaka

(10) Patent No.: US 11,668,838 B2
(45) Date of Patent: Jun. 6, 2023

(54) COMMUNICATION APPARATUS, INFORMATION PROCESSING APPARATUS, AND INFORMATION PROCESSING METHOD

(71) Applicant: SONY CORPORATION, Tokyo (JP)

(72) Inventor: Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 593 days.

(21) Appl. No.: 16/630,923

(22) PCT Filed: May 9, 2018

(86) PCT No.: PCT/JP2018/017854
§ 371 (c)(1),
(2) Date: Jan. 14, 2020

(87) PCT Pub. No.: WO2019/026374
PCT Pub. Date: Feb. 7, 2019

(65) Prior Publication Data
US 2020/0233093 A1    Jul. 23, 2020

(30) Foreign Application Priority Data
Aug. 4, 2017    (JP) .............................. JP2017-151704

(51) Int. Cl.
*G01S 19/32*    (2010.01)
*G01S 19/36*    (2010.01)
(Continued)

(52) U.S. Cl.
CPC .............. *G01S 19/32* (2013.01); *G01S 19/36* (2013.01); *H01Q 1/288* (2013.01); *H01Q 21/061* (2013.01); *G01S 19/43* (2013.01)

(58) Field of Classification Search
None
See application file for complete search history.

(56) References Cited

U.S. PATENT DOCUMENTS 4,929,959 A * 5/1990 Sorbello .............. H01Q 21/061
343/700 MS
5,400,042 A * 3/1995 Tulintseff ................. H01Q 5/42
343/793
(Continued)

FOREIGN PATENT DOCUMENTS

CN    101743665 A    6/2010
CN    103887602 A    6/2014
(Continued)

OTHER PUBLICATIONS

International Search Report and Written Opinion of PCT Application No. PCT/JP2018/017854, dated Jun. 19, 2018, 12 pages of ISRWO.

*Primary Examiner* — Bernarr E Gregory
(74) *Attorney, Agent, or Firm* — Chip Law Group

(57) ABSTRACT

A Provided is a communication device that includes a plurality of antenna units that are arranged in an array. Each of the antenna units includes a first antenna element and a second antenna element that are arranged in a first direction, a first receiving unit that receives a first wireless signal used in satellite positioning, via the first antenna element, and a second receiving unit receives a second wireless signal used in the satellite positioning, via the second antenna element. Among the antenna units, a first and a second antenna units that are positioned adjacently to each other in a second direction being perpendicular to the first direction are arranged in such a manner that the first antenna element in one of the first and the second antenna is positioned adjacently to the second antenna element in the other antenna in the second direction.

12 Claims, 11 Drawing Sheets

(51) Int. Cl.
*H01Q 1/28* (2006.01)
*H01Q 21/06* (2006.01)
*G01S 19/43* (2010.01)

(56) References Cited

U.S. PATENT DOCUMENTS

| | | | | |
|---|---|---|---|---|
| 5,510,803 | A * | 4/1996 | Ishizaka | H01Q 21/061 343/846 |
| 8,760,344 | B2 * | 6/2014 | Mercier | G01S 19/44 342/357.44 |
| 9,716,321 | B2 * | 7/2017 | Oppenlaender | H01Q 21/064 |
| 2003/0137456 | A1 | 7/2003 | Sreenivas et al. | |
| 2003/0218571 | A1 * | 11/2003 | Yoon | H01Q 21/062 343/824 |
| 2004/0155820 | A1 | 8/2004 | Sreenivas et al. | |
| 2009/0067115 | A1 | 3/2009 | Arslan et al. | |
| 2010/0289717 | A1 | 11/2010 | Arslan et al. | |
| 2014/0198014 | A1 | 7/2014 | Fasenfest | |
| 2014/0266963 | A1 | 9/2014 | Fasenfest | |
| 2015/0222025 | A1 * | 8/2015 | Song | H01Q 5/42 343/893 |
| 2017/0153332 | A1 | 6/2017 | Wallace et al. | |

FOREIGN PATENT DOCUMENTS

| | | | |
|---|---|---|---|
| CN | 107102340 A * | 8/2017 | ............ G01S 19/21 |
| EP | 2493014 A2 | 8/2012 | |
| JP | 2009-074930 A | 4/2009 | |
| JP | 5078082 B2 | 11/2012 | |
| JP | 2014-016315 A | 1/2014 | |
| JP | 5469061 B2 | 4/2014 | |
| JP | 2016-503275 A | 2/2016 | |
| JP | 5972215 B2 | 8/2016 | |
| KR | 10-2010-0055384 A | 5/2010 | |
| WO | 2008/152428 A1 | 12/2008 | |
| WO | 2014/113513 A2 | 7/2014 | |

* cited by examiner

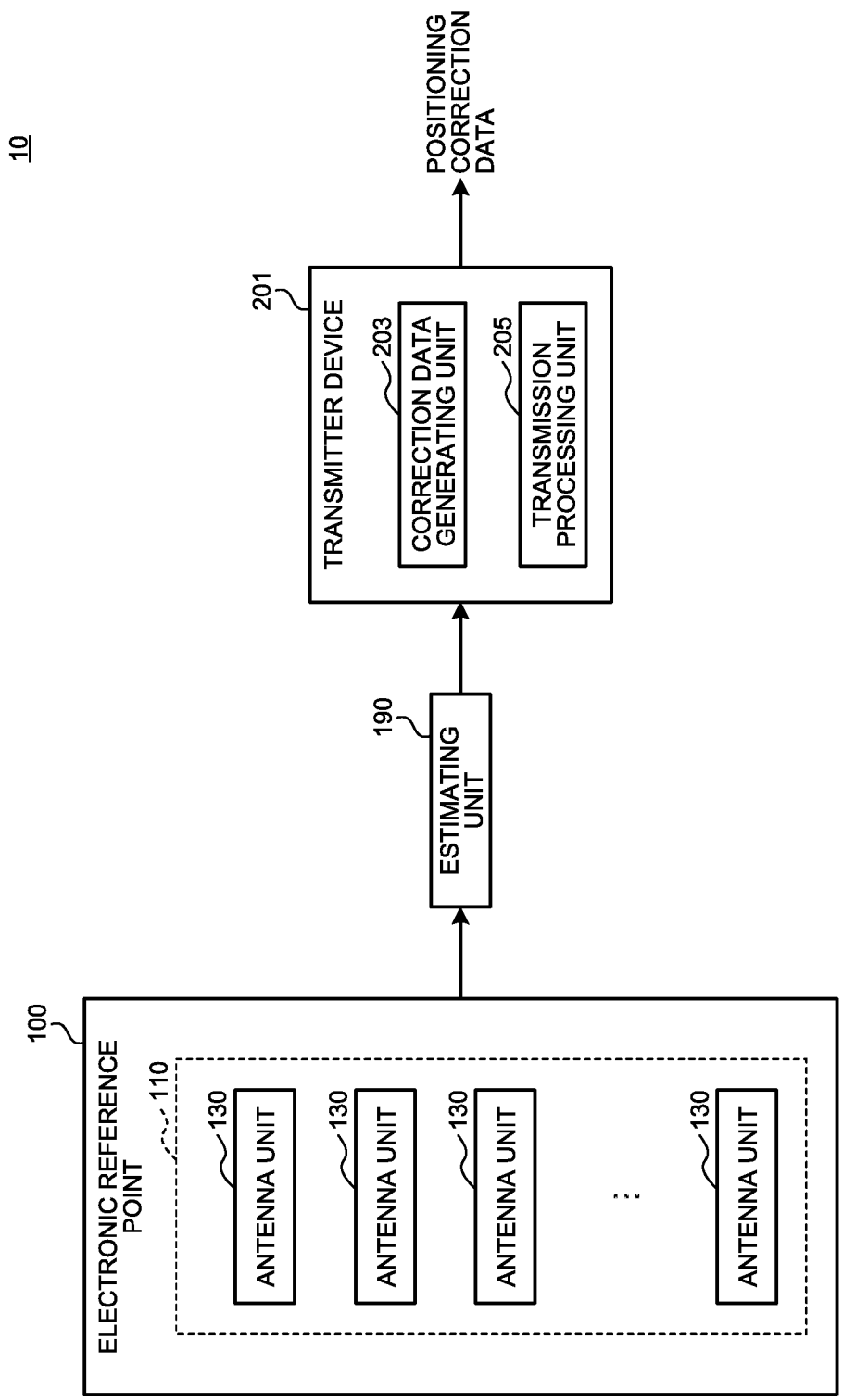

FIG.6

Algorithm 1 Calculate the initial phase biases $b_1, b_2$

Input: $\{R^s_{P_1,i}, R^s_{P_2,i}, \Phi^s_{L_1,i}, \Phi^s_{L_2,i}\}_{i=1}^N$

Output: $b^s_1, b^s_2$ $b^s_1 \Leftarrow \frac{1}{N}\sum_{i=1}^{n}[-(\tilde{\alpha}_1 + \tilde{\alpha}_2)R^s_{P_3,i} + \Phi^s_{L_1,i} + 2\tilde{\alpha}_1 R^s_{P_2,i}]$ $b^s_2 \Leftarrow \frac{1}{N}\sum_{i=1}^{n}[(\tilde{\alpha}_1 + \tilde{\alpha}_2)R^s_{P_3,i} + \Phi^s_{L_2,i} - 2\tilde{\alpha}_2 R^s_{P_2,i}]$ $b^s_1 \Leftarrow b^s_1 \bmod \lambda_1$ $b^s_2 \Leftarrow b^s_2 \bmod \lambda_2$

COMMUNICATION APPARATUS, INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2018/017854 filed on May 9, 2018, which claims priority benefit of Japanese Patent Application No. JP 2017-151704 filed in the Japan Patent Office on Aug. 4, 2017. Each of the above-referenced applications is hereby incorporated herein by reference in its entirety.

FIELD

The present disclosure relates to a communication apparatus, an information processing apparatus, and an information processing method.

BACKGROUND

Recently, various technologies for implementing a global navigation satellite system (GNSS), which is what is called a satellite positioning system, such as the Global Positioning System (GPS), Galileo, the GLObal NAvigation Satellite System (GLONASS), and the Quasi-Zenith Satellite System (QZSS), have been developed. Examples of techniques for satellite positioning used in such systems include techniques called Real Time Kinematic (RTK) and Precise Point Positioning (PPP).

Also having been recently coming to an attention is a positioning technique called PPP-RTK that is a combination of the PPP and the RTK. In the PPP-RTK, by making an additional use of a piece of correction information called a fractional cycle bias (FCB) that is specific to each satellite, an ambiguity determination, a reduction in the initialization time, and an improvement in the precision are made possible. For example, Patent Literature 1 discloses an example of a satellite positioning system using the PPP-RTK technique.

CITATION LIST

Patent Literature

Patent Literature 1: JP 2014-016315 A

SUMMARY

Technical Problem

However, because a satellite positioning system using the PPP-RTK technique imposes relatively high-level demands on the specification of the electronic reference point used in the system, e.g., with a requirement for multi-frequency support, antennas and receivers used in the system tend to become more expensive, and implementation costs tend to increase.

Therefore, the disclosure proposes a technology capable of reducing the implementation costs of a satellite positioning system.

Solution to Problem

According to the present disclosure, a communication device is provided that includes: a plurality of antenna units that are arranged in an array, wherein each of the antenna units comprises: a first antenna element and a second antenna element that are arranged in a first direction; a first receiving unit that receives a first wireless signal used in satellite positioning, via the first antenna element; and a second receiving unit that receives a second wireless signal used in the satellite positioning, via the second antenna element, and among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

According to the present disclosure, an information processing apparatus is provided that includes: an acquiring unit that acquires reception results of a first wireless signal and of a second wireless signal that are used in satellite positioning, the first wireless signal and the second wireless signal being received by each of a plurality of antenna units that are arranged in an array; and an estimating unit that estimates carrier-related information of at least one the first wireless signal and the second wireless signal controlled on a satellite side, based on the acquired reception results, wherein each of the antenna units comprises: a first antenna element and a second antenna element that are arranged in a first direction; a first receiving unit that receives a first wireless signal, via the first antenna element; and a second receiving unit that receives the second wireless signal, via the second antenna element, and among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

According to the present disclosure, an information processing method is provided that causing a computer to execute: acquiring reception results of a first wireless signal and a second wireless signal that are used in satellite positioning, and that are received by each of a plurality of antenna units that are arranged in an array, each of the antenna units including a first antenna element and a second antenna element that are arranged in a first direction, a first receiving unit that receives the first wireless signal via the first antenna element, and a second receiving unit that receives the second wireless signal via the second antenna element; and estimating carrier-related information of at least one of the first wireless signal and the second wireless signal that are controlled on a satellite side, based on the acquired reception results, wherein among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

Advantageous Effects of Invention

As explained above, according to the present disclosure, a technology capable of reducing implementation costs of a satellite positioning system is provided.

The advantageous effect described above is not limiting, and any other advantageous effects mentioned in or those

BRIEF DESCRIPTION OF DRAWINGS

FIG. 5 is a block diagram illustrating an example of a functional configuration of the satellite positioning system according to the embodiment.

FIG. 6 is a schematic illustrating an example of an algorithm related to an estimation of an initial carrier phase bias in the satellite positioning system according to the embodiment.

DESCRIPTION OF EMBODIMENTS

A preferred embodiment of the present disclosure will now be explained in detail with reference to the appended drawings. In the description and drawings, the elements having substantially the same functional configurations will be assigned the same reference signs, and redundant explanations thereof will be omitted.

The explanations will be provided in the following order.
1. General Configuration
2. Discussions about Satellite Positioning
3. Technological Characteristics
3.1. Configuration of Antenna Device at Electronic reference point
3.2. Functional Configuration
3.3. Modification
4. Application Examples
4.1. Application Example 1: Example of Single-frequency Positioning Device
4.2. Application Example 2: Example of Dual-frequency Positioning Device
5. Hardware Configuration
6. Conclusion

1. General Configuration

Figure 1:
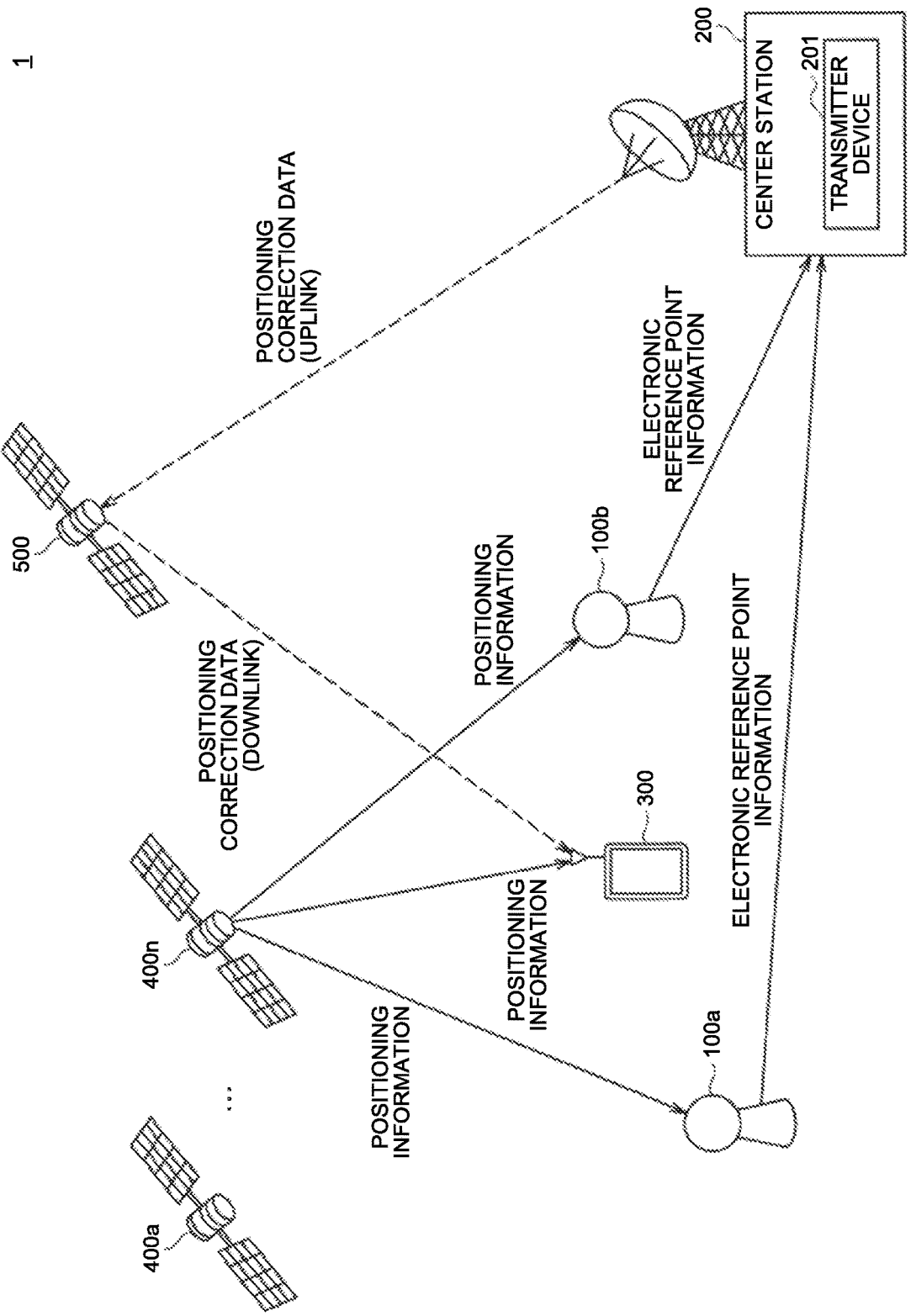
FIG. 1 is a schematic for explaining an example of a general system configuration of a satellite positioning system according to one embodiment of the present disclosure.

To begin with, as an example of a general system configuration of a satellite positioning system according to one embodiment of the present disclosure, a particular example of a system configuration enabled to use the PPP-RTK technique will now be explained with reference to FIG. 1. FIG. 1 is a schematic for explaining an example of a general system configuration of a satellite positioning system according to the embodiment.

As illustrated in FIG. 1, this satellite positioning system 1 according to the embodiment includes GPS satellites 400a to 400n, electronic reference points 100a to 100n, a center station 200, a quasi-zenith satellite 500, and a positioning device 300. In the explanation hereunder, when the GPS satellites 400a to 400n are not particularly distinguished from one another, the GPS satellites 400a to 400n will also be simply referred to as a "GPS satellite 400". In the same manner, when the electronic reference points 100a to 100n are not particularly distinguished from one another, the electronic reference points 100a to 100n will also be simply referred to as an "electronic reference point 100".

The GPS satellite 400 transmits positioning information used in satellite positioning via a wireless signal. In the satellite positioning system 1 according to the embodiment, the GPS satellite 400 may transmit the positioning information using a plurality of wireless signals each at a frequency that is different from one another. As a specific example, two types of wireless signals (positioning signals) that are an L1 signal in a 1575.42 MHz band and an L2 signal in a 1227.60 MHz band may be used in transmitting the positioning information. Instead of one of the L1 signal and the L2 signal, an L5 signal in a 1176.45 MHz band may be used. The L1 signal, the L2 signal, and the L5 signal mentioned above are merely one example, and the wireless signals used in transmitting the positioning information are not limited thereto. The wireless signals used in the transmission of the positioning information correspond to examples of a "first wireless signal" and a "second wireless signal".

The electronic reference point 100 receives the positioning information transmitted from the GPS satellite 400 via the wireless signal. The electronic reference point 100 generates information including a pseudo-range between the electronic reference point 100 and the GPS satellite 400, a Doppler frequency, a carrier phase, and the like (hereinafter, also referred to as an "electronic reference point information"), based on the received result of the positioning information, and transmits the information to the center station 200. The electronic reference point 100 is installed at each location of an area that is covered by the satellite positioning.

The center station 200 includes a transmitter device 201. The transmitter device 201 acquires the electronic reference point information from the electronic reference point 100 installed at each location, and generates positioning correction data that is used by the positioning device 300 in satellite positioning, based on the acquired electronic reference point information.

The positioning correction data includes a data set that contains a corrected satellite clock error with time mapped thereto and a region-specific error, in units of a predetermined time period (frame), for example. At this time, a plurality of data sets may be included within one frame (that is, within one cycle). The region-specific error includes information related to errors specific to the region where the electronic reference point 100 is installed, and examples of which include a tropospheric delay error and an ionospheric delay error. At least some of the data sets may include satellite-specific errors. A satellite-specific error includes information related to errors that are specific to each GPS satellite, and examples of which include a satellite orbit error and a frequency time bias.

The transmitter device 201 transmits the generated positioning correction data to the quasi-zenith satellite 500 (uplink), via an antenna of the center station 200, over a wireless signal, for example.

The quasi-zenith satellite 500 receives the positioning correction data transmitted from the center station 200 over the wireless signal. The quasi-zenith satellite 500 transmits the received positioning correction data to the positioning device 300, via a wireless signal.

The positioning device 300 is maintained on a mobile body such as a vehicle, or a portable device such as a wearable device or a smartphone. The positioning device 300 performs the satellite positioning based on the positioning information received from the GPS satellite 400, and on the positioning correction data received from the quasi-zenith satellite 500.

Explained above, with reference to FIG. 1, as an example general system configuration of the satellite positioning system according to one embodiment of the present disclosure, is a particular example of the system configuration enabled to use the PPP-RTK technique.

2. Discussions About Satellite Positioning

Satellite positioning will now be explained, to start with, and issues to be addressed by the satellite positioning system according to the embodiment (that is, issues in the satellite positioning system that uses the PPP-RTK technique) will then be organized.

Examples of available satellite positioning techniques include a technique called Real-time Kinematic (RTK) and a technique called Precise Point Positioning (PPP).

Specifically, the RTK is a technique in which a reference station is installed at known coordinate points, and a positioning calculation is performed by observing wireless signals transmitted from two satellites, at two reception points that are the reference station and a mobile station (receiver). In the RTK, it is possible to remove the satellite clock error and the receiver clock error by calculating a double phase difference in the carriers during the positioning calculation. Furthermore, if the baseline length is sufficiently short, it is possible to remove errors in the ionospheric and tropospheric transmission delays, included as the same values in each pseudo-range, and the satellite orbit error, almost completely.

The PPP is a technique that performs the positioning using a single observation point, and is different from the RTK in that no reference observation point, such as a reference station, is required near the receiver. In the PPP, a predetermined satellite (e.g., a geostationary satellite) transmits its orbit record and clock data to a receiver, as a piece of correction information. In the PPP, based on such a configuration, by fixing the orbit record and the clock data of the satellite as known, the position of and the receiver clock error of the observation point are estimated using the observation values of positioning signals transmitted from a plurality of satellites. Furthermore, because the PPP uses an undifferenced carrier phase as a basic observable, it is possible to perform positioning at a higher precision.

PPP-RTK corresponds to a positioning technique that is a combination of the PPP and the RTK. In the PPP-RTK, by making additional use of a piece of correction information called a fractional cycle bias (FCB) that is specific to each satellite, an ambiguity determination, a reduction in the initialization time, and an improvement in the precision are made possible. Specifically, in the PPP-RTK, a predetermined satellite (e.g., the geostationary satellite) transmits, in addition to an orbit record and clock data of the satellite, phase bias information of the satellite to a receiver, as the correction information. As another example, such pieces of correction information may be distributed to a receiver via a predetermined network, such as the Internet. By causing the receiver to make the ambiguity determination based on the correction information, the initialization time can be reduced. Furthermore, the PPP-RTK also performs precision absolute positioning using actual state-space data, based on a network of electronic reference points (RTK network). In this manner, the PPP-RTK can achieve positioning in the order of centimeters, as a post-process and in real time, with an initialization time of a few seconds or so.

However, because the satellite positioning system using the PPP-RTK technique (for example, the electronic reference points 100 illustrated in FIG. 1) tends to impose relatively high-level demands on the specifications of electronic reference points used in the system (e.g., with a requirement for multi-frequency support), antennas, receivers, and other components used in the system tend to become more expensive, and implementation costs tend to increase.

Furthermore, in order to estimate a satellite's orbit, an ionospheric delay, a tropospheric delay, and the like, a wide and dense network of electronic reference points will be required. Specifically, a satellite's orbit changes due to the influence of the gravitational field of the Earth, which is not uniform, or in response to an orbit correcting operation, and monitoring in a wider scale (ideally, monitoring in a global scale) will be required to capture such a change. Furthermore, because the ionospheric delay and the tropospheric delay lack a linear correlation over a long distance, local observation information from a plurality of locations will be needed, and therefore, a denser network of electronic reference points will be required. Therefore, the number of networks will be larger than the number of the installed electronic reference points, so that the costs tends to increase even more.

To address these issues, disclosed herein is a technology that enables the implementation costs of electronic reference points to be reduced, and to further reduce the implementation costs of a satellite positioning system that uses the PPP-RTK technique.

3. Technological Characteristics

Technological characteristics of a satellite positioning system according to the embodiment will now be explained.

<3.1. Configuration of Antenna Device at Electronic reference point>

To begin with, a configuration of the electronic reference point 100 used in the satellite positioning system according to the embodiment will be explained with reference to FIGS. 2 to 4, with a particular focus on a configuration of the antenna device that receives the wireless signals transmitted from the GPS satellite 400.

Figure 2:
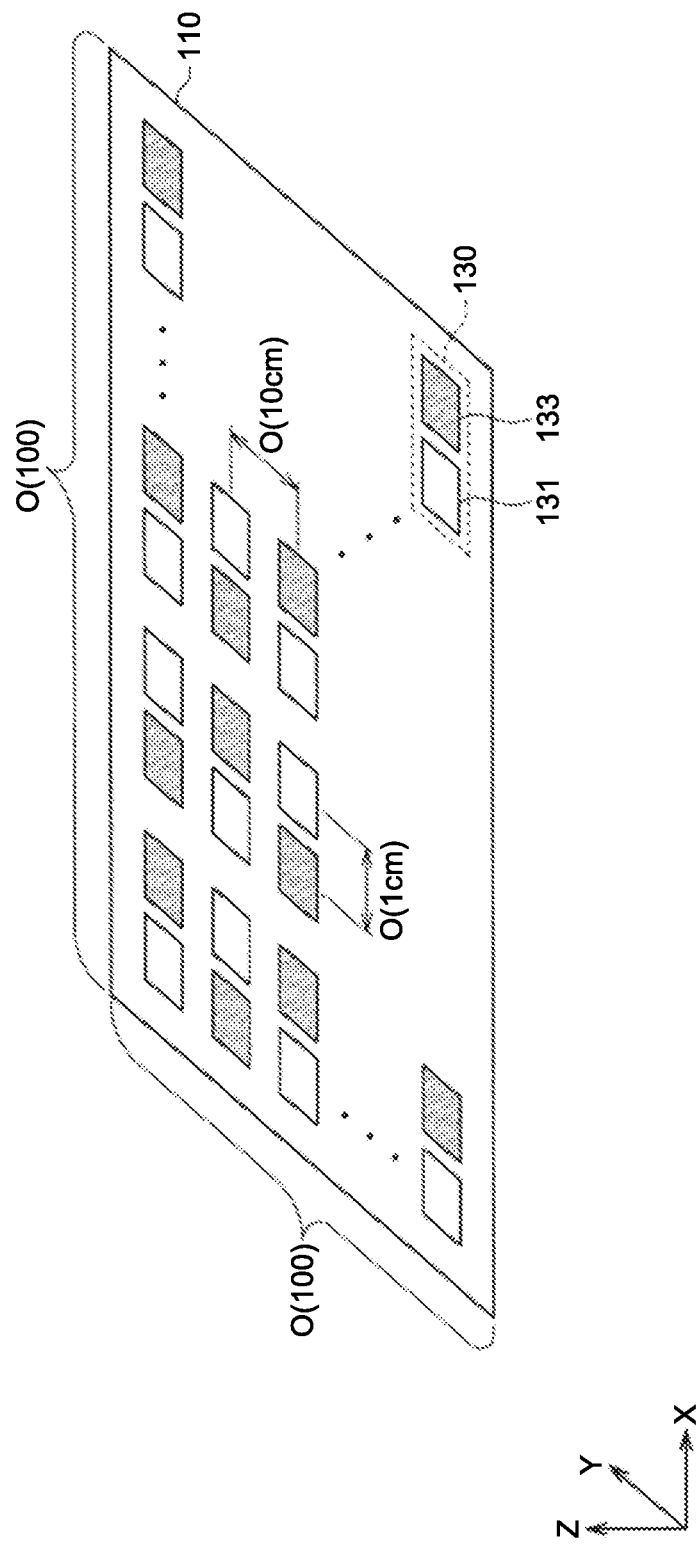
FIG. 2 is a schematic for explaining an example of a general configuration of an antenna device used in an electronic reference point according to the embodiment.

For example, FIG. 2 is a schematic for explaining an example of a general configuration of the antenna device used in the electronic reference point according to the embodiment. As illustrated in FIG. 2, an antenna device 110 used in the electronic reference point 100 according to the embodiment is structured as what is called an array antenna, in which a basic unit denoted by a reference sign 130 (hereinafter, also referred to as an "antenna unit 130") is arranged in plurality in an array. The antenna unit 130 includes an antenna element 131 enabled to receive the first wireless signal, and an antenna element 133 enabled to receive the second wireless signal. For example, in the example illustrated in FIG. 2, each of the antenna elements 131 and 133 is configured as a planar antenna (patch antenna). In the explanation hereunder, it is assumed that the L1 signal is used as the first wireless signal, and the L2 signal is used as the second wireless signal.

An example of the antenna unit 130 will now be explained with reference to FIG. 3. FIG. 3 is a schematic for explaining an example of a general configuration of the basic unit included in the antenna device used in the electronic reference point according to the embodiment, illustrating an example of the configuration of the antenna unit 130. As illustrated in FIG. 3, the antenna unit 130 includes antenna elements 131 and 133, receivers 135 and 137, and a receiver clock 139. The antenna elements 131 and 133 correspond to the antenna elements 131 and 133 illustrated in FIG. 2, respectively. One of the antenna elements 131 and 133 corresponds to an example of a "first antenna element", and the other corresponds to an example of a "second antenna element". One of the receivers 135 and 137 corresponds to an example of a "first receiving unit", and the other corresponds to an example of a "second receiving unit".

The receiver clock 139 is a structure for acquiring time information (clock data) on the receiver side (that is, on the side of the electronic reference point 100) in satellite positioning. As illustrated in FIG. 3, the receiver clock 139 is shared between the receivers 135 and 137. When the antenna unit 130 is arranged in plurality into an array, as illustrated in FIG. 2, it is suitable for one receiver clock 139 to be shared among two or more antenna units 130 (that is, the entire antenna units 130). The receiver clock 139 corresponds to an example of a "time measuring unit".

The receiver 135 receives the L1 signal transmitted from the GPS satellite 400 via the antenna element 131, and decodes the positioning information by applying a predetermined decoding process to the received L1 signal. Based on the decoded result of the positioning information and the result of time measurement performed by the receiver clock 139, the receiver 135 obtains information related to a code pseudo-range pertaining to the transmission of the L1 signal, and information related to the carrier phase of the L1 signal.

The receiver 137 also receives the L2 signal transmitted from the GPS satellite 400 via the antenna element 133, and decodes the positioning information by applying a predetermined decoding process to the received L2 signal. Based on the decoded result of the positioning information and the result of time measurement performed by the receiver clock 139, the receiver 137 then obtains information related to a code pseudo-range pertaining to the transmission of the L2 signal, and the information related to the carrier phase of the L2 signal.

Explained above with reference to FIG. 3 is an example of the configuration of the antenna unit 130.

A more specific configuration of the antenna device 110 will now be explained with reference to FIGS. 2 and 4. FIG. 4 is a schematic for explaining an example of a general configuration of the antenna device used in the electronic reference point according to the embodiment, illustrating an example of a layout of a plurality of the antenna units 130. In the explanation hereunder, for convenience, the normal direction of the antenna elements 131 and 133 included in the antenna units 130 will be referred to as a z direction. The directions that are perpendicular to the z direction, and that are perpendicular to each other will be referred to as an x direction and a y direction. In other words, the x direction and the y direction correspond to directions extending in parallel with the surface of the antenna elements 131 and 133.

In the explanation herein, to make the configuration of the antenna device 110 more easily understandable, it is assumed that the antenna units 130 are arranged in an array along the x direction and the y direction. Furthermore, it is also assumed that the antenna elements 131 and 133 included in each of the antenna units 130 are arranged adjacently to each other in the x direction. In the example illustrated in FIGS. 1 and 3, the x direction corresponds to an example of a "first direction", and the y direction corresponds to an example of a "second direction".

The antenna device 110 may be configured to be a two-dimensional arrangement of the antenna units 130, in the number in the order of $10^4$ or so. For example, in the example illustrated in FIG. 2, the antenna units 130, in the number in the order of 100 or so, are arranged in each of the x direction and the y direction in an array. It is suitable for the interval between the antenna elements 131 and 133 in the antenna unit 130 to be set to the order of 1 centimeter or so. It is also suitable for the interval between the adjacent antenna units to be set to the order of 10 centimeters or so.

In the antenna device 110 according to the embodiment, two antenna units 130 positioned adjacently to each other at least in a part of the y direction are arranged in such a manner that the antenna element 131 included in one of the antenna units 130 is positioned adjacently to the antenna element 133 in the other antenna unit 130 in the y direction. For example, in the example illustrated in FIG. 4, antenna units 130a and 130d are arranged in such a manner that the antenna element 131 in one of the antenna units 130a and 130d is positioned adjacently to the antenna element 133 in the other antenna units, in the y direction. The same applies to antenna units 130d and 130e, and antenna units 130e and 130f. One of the two antenna units 130 positioned adjacently to each other in the y direction corresponds to a "first antenna unit", and the other corresponds to a "second antenna unit".

Figure 4:
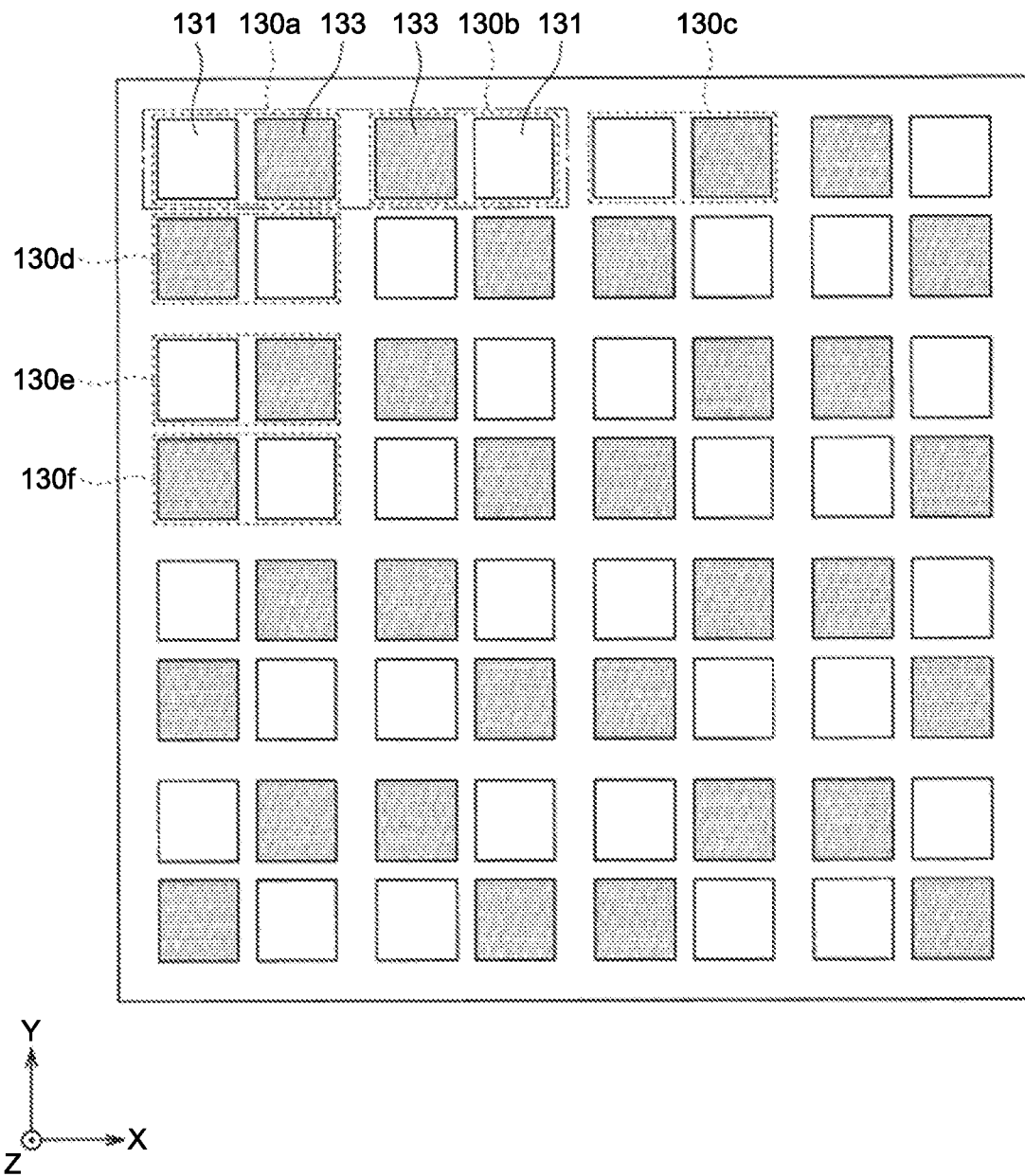
FIG. 4 is a schematic for explaining an example of a general configuration of the antenna device used in the electronic reference point according to the embodiment.

In the example illustrated in FIG. 4, let us now focus on the two antenna units 130 positioned adjacently to each other in the x direction. These two antenna units 130 are arranged in such a manner that one of the antenna elements 131 and 133 in one of the antenna units 130 is positioned adjacently to the one antenna element 131 or 133 in the other antenna unit 130 in the x direction. For example, in the example illustrated in FIG. 4, the antenna units 130a and 130b are arranged in such a manner that the antenna element 133 in the antenna unit 130a is positioned adjacently to the antenna element 133 in the antenna unit 130b. The antenna units 130b and 130c are arranged in such a manner that the antenna element 131 in the antenna unit 130b is positioned adjacently to the antenna element 131 in the antenna unit 130c. One of the two antenna units 130 positioned adjacently to each other in the x direction corresponds to a "third antenna unit", and the other corresponds to a "fourth antenna unit".

Based on the configuration described above, in the electronic reference point 100 according to the embodiment, the antenna units 130 included in the antenna device 110 receive the L1 signal and the L2 signal transmitted from the GPS satellite 400. The satellite positioning system 1 according to the embodiment then estimates, based on the result of receiving the L1 signal and the L2 signal, being received by each of the antenna units 130, carrier-related information of the L1 signal and the L2 signal, which are dependent on the delays specific to the GPS satellite 400 (internal delay) (that is, information under the control of the GPS satellite 400). The carrier-related information is information corresponding to at least some of indefinite terms of a carrier phase, which is one of the observables at a GNSS receiver, and examples of which include an initial bias and an initial phase bias of the carrier. A process related to this estimation will be explained later in detail, in a separate section.

Explained above, with reference to FIGS. 2 and 4, is the configuration of the electronic reference point 100 used in the satellite positioning system according to the embodiment, with a particular focus on the configuration of the antenna device that receives a wireless signal transmitted from the GPS satellite 400.

<3.2. Functional Configuration>

An example of a functional configuration of the satellite positioning system according to the embodiment will now be explained, with a particular focus on a process for estimating the carrier-related information of the wireless signals received from the GPS satellite, the process being performed based on the reception results of the wireless signals from the GPS satellite, being received by the electronic reference point.

For example, FIG. 5 is a block diagram illustrating an example of a functional configuration of the satellite positioning system according to the embodiment. The example illustrated in FIG. 5 gives a partial view of the satellite positioning system 1 illustrated in FIG. 1, with a focus on a configuration corresponding to the process from when the electronic reference point 100 receives the wireless signals from the GPS satellite 400, and to when the correction data that is to be transmitted from the transmitter device 201 in the center station 200 to the quasi-zenith satellite 500 is generated. Therefore, in the explanation hereunder, the system illustrated in FIG. 3 (that is, the system that is a part of the satellite positioning system 1) will be sometimes referred to as a "system 10" to distinguish the system from the satellite positioning system 1 illustrated in FIG. 1.

Figure 3:
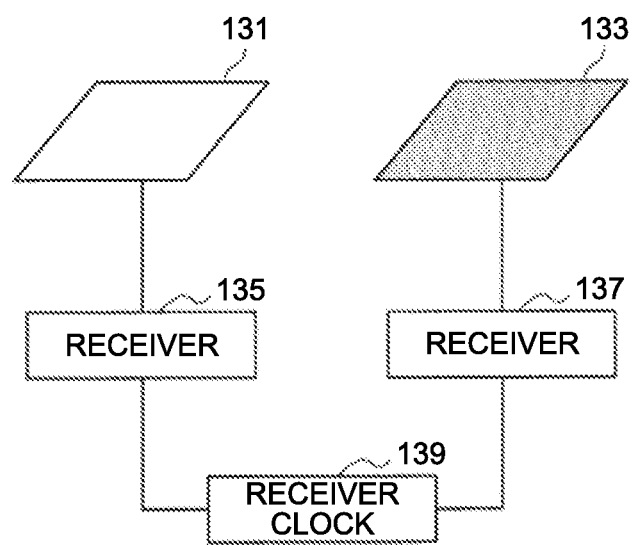
FIG. 3 is a schematic for explaining an example of a general configuration of a basic unit of the antenna device used in the electronic reference point according to the embodiment.

As illustrated in FIG. 3, the system 10 includes the electronic reference point 100, an estimating unit 190, and the transmitter device 201. The transmitter device 201 includes a correction data generating unit 203. The electronic reference point 100 corresponds to the electronic reference point 100 illustrated in FIG. 1. In other words, the antenna device 110 and the antenna units 130 in the antenna device 110 illustrated in FIG. 5 correspond to the antenna device 110 and the antenna units 130 explained above with reference to FIGS. 2 and 4.

The estimating unit 190 is a unit for estimating the carrier-information of the L1 signal and that of the L2 signal transmitted from the GPS satellite 400. As mentioned earlier, examples of this carrier-related information include the initial bias and the initial phase bias of the carrier. The initial carrier bias corresponds to a bias applied to the wireless signal under the control of the satellite, before the wireless signal is transmitted. In the initial carrier bias, an initial carrier phase bias corresponds particularly to a phase offset at the time of the wireless signal transmission. Denoting the initial carrier bias by B, the initial carrier phase bias by b, and the wavelength of the wireless signal received from the GPS satellite by λ, and the wavenumber of the wireless signal by N, the initial carrier bias B is expressed as a relational expression indicated as (Expression 1) below.

$$B = b + \lambda N \quad \text{(Expression 1)}$$

A process related to the estimation of the carrier-related information, performed by the estimating unit 190, will now be explained more in detail. In the explanation hereunder, the denotation "x~" indicates x having a tilde appended on top of the character x.

Specifically, the estimating unit 190 acquires the information related to the positioning information, which is decoded from the reception results of the L1 signal and the L2 signal, being received by each of the antenna units 130 included in the antenna device 110, from the electronic reference point 100. Examples of the information includes information related to a P1 code pseudo-range and information related to an L1 carrier phase both of which correspond to the L1 signal, and information related to a P2 code pseudo-range and information related to an L2 carrier phase both of which correspond to the L2 signal. In the explanation hereunder, using "i" as a suffix, "$R^s_{Pi}$" will denote a Pi code pseudo-range that corresponds to the Li signal, based on the reception result of the Li signal transmitted from a satellite s (GPS satellite), being received by a receiver $r_i$ corresponding to the Li signal. "$\phi^s_{Li}$" will denote a Li carrier phase corresponding to the Li signal. In other words, the P1 code pseudo-range corresponding to the L1 signal will be denoted as "$R^s_{P1}$", and the L1 carrier phase corresponding to the L1 signal will be denoted as "$\phi^s_{L1}$". In the same manner, the P2 code pseudo-range corresponding to the L2 signal will be denoted as "$R^s_{P2}$", and the L2 carrier phase corresponding to the L2 signal will be denoted as "$\phi^s_{L2}$".

The Pi code pseudo-range $R^s_{Pi}$ and the Li carrier phase $\phi^s_{Li}$ corresponding to the Li signal are modelled as the following (Expression 2) and (Expression 3), respectively.

$$R_{Pi}{}^s = \rho_i{}^s + c(\delta t_r - \delta t^s) + T_i{}^s + \tilde{\alpha}_i(I_i{}^s + K_{21}) + M_i{}^s + \varepsilon p_i \quad \text{(Expression 2)}$$

$$\Phi_{Li}{}^s = \rho_i{}^s + c(\delta t_r - \delta t^s) + T_i{}^s - \tilde{\alpha}_i(I_i{}^s + K_{21}) + B_i{}^s + \lambda_i \omega + m_i{}^s + \varepsilon p_i \quad \text{(Expression 3)}$$

In (Expression 2) and (Expression 3), $\rho_i{}^s$ denotes an antenna phase center distance between the satellite s and the receiver $r_i$ corresponding to the Li signal. $\delta t_r$ denotes a receiver clock error that is common between a receiver $r_1$ corresponding to the L1 signal and a receiver $r_2$ corresponding to the L2 signal. $\delta t^s$ denotes a satellite clock error. $T_i{}^s$ denotes a tropospheric delay between the satellite s and the receiver $r_i$. $K_{21}$ is a quantity defined by a difference between a receiver differential code bias (DCB) "$K_{P2} - K_{P1}$" and a satellite DCB "$K_{P2}{}^s - K_{P1}{}^s$". Each of $M_i{}^s$ and $m_i{}^s$ denotes a multipath bias. $\lambda_i \omega$ denotes a phase wind-up. $\tilde{\alpha}_i$ is a dimensionless quantity defined by a conversion factor expressed by (Expression 4) below, and is expressed by a calculation expression indicated as (Expression 5) below. In the expression below, $1\text{TECU} = 10^{16} e^-/m^2$.

$$\alpha_i = \frac{40.3 \times 10^{16}}{f_i^2} m/TECU \quad \text{(Expression 4)}$$

$$\tilde{\alpha}_i \equiv \alpha_i / (\alpha_2 - \alpha_1) \quad \text{(Expression 5)}$$

$I_i{}^s$ is a quantity defined by a calculation expression indicated below as (Expression 6), using a total electron counts $STEC_i{}^s$ in the wave path between the satellite s and the receiver $r_i$.

$$I_i{}^s = (\alpha_2 - \alpha_1) STEC_i{}^s \quad \text{(Expression 6)}$$

$B_i{}^s$ denotes a phase bias corresponding to an Ni signal, and expressed by a calculation expression indicated below as (Expression 7), denoting the initial phase bias corresponding to the Ni signal by $b_i^s$, the carrier wavelength by $\lambda_i$, and an integer phase bias by $N_i^s$, in the same manner as in (Expression 1) above.

$$B_i^s = b_i^s + \lambda_i N_i^s \quad \text{(Expression 7)}$$

In the explanation hereunder, to simplify the denotations, quantities defined in (Expression 8) to (Expression 15) will be used.

$$\tilde{\rho}_r^s \equiv \frac{\rho_1^s + \rho_2^s}{2} + c(\delta t_r - \delta t^s) + \frac{T_1^s + T_2^s}{2} \quad \text{(Expression 8)}$$

$$\tilde{I}_r^s \equiv \frac{I_1^s + I_2^s}{2} + K_{21} \quad \text{(Expression 9)}$$

$$e_P \equiv \frac{M_1^s + M_2^s}{2} + \frac{\varepsilon_{P1} + \varepsilon_{P2}}{2} \quad \text{(Expression 10)}$$

$$e_L \equiv \frac{m_1^s + m_2^s}{2} + \frac{\varepsilon_{L1} + \varepsilon_{L2}}{2} \quad \text{(Expression 11)}$$

$$\Delta \tilde{\rho}_r^s \equiv \frac{\rho_1^s - \rho_2^s}{2} + \frac{T_1^s - T_2^s}{2} \quad \text{(Expression 12)}$$

$$\Delta \tilde{I}_r^s \equiv \frac{I_1^s - I_2^s}{2} \quad \text{(Expression 13)}$$

$$\Delta e_P \equiv \frac{M_1^s - M_2^s}{2} + \frac{\varepsilon_{P1} - \varepsilon_{P2}}{2} \quad \text{(Expression 14)}$$

$$\Delta e_L \equiv \frac{m_1^s - m_2^s}{2} + \frac{\varepsilon_{L1} - \varepsilon_{L2}}{2} \quad \text{(Expression 15)}$$

(Expression 8) and (Expression 9) are quantities corresponding to operations for averaging the geometric distance, the amount of tropospheric delay, and the amount of the ionospheric delay. These quantities are quantities for virtually defining an antenna phase center of the basic unit (the antenna unit 130), that is, quantities introduced to regard the basic unit as a pseudo-dual-frequency antenna receiver. (Expression 10) and (Expression 11) represent quantities that are expected to be removed statistically in averaging operations by installing the basic units in a large number (e.g., $10^4$ or so), as illustrated in FIG. 2, for example. (Expression 12) and (Expression 13), which are defined by a difference of variables, are quantities that are expected to be cancelled out by each other and removed, by arranging the basic units (the antenna unit 130) alternatingly in such a manner that the antenna element 131 is positioned adjacently to the antenna element 133, as illustrated in FIG. 4, for example. (Expression 14) and (Expression 15), which are defined by a difference of variables, are quantities that are expected to be removed by installing the basic unit in a large number, and by arranging the basic units alternatingly in such a manner that the antenna element 131 is positioned adjacently to the antenna element 133.

Based on the above, the P1 code pseudo-range $R^s_{P1}$ and L1 carrier phase $\phi^s_{L1}$ corresponding to the L1 signal, and P2 code pseudo-range $R^s_{P2}$ and the L2 carrier phase $\phi^s_{L2}$ corresponding to the L2 signal are expressed by calculations indicated below as (Expression 16) to (Expression 19), respectively.

$$R_{P1}^s = \tilde{\rho}_r^s + \tilde{a}_1 \tilde{I}_r^s + e_P + \Delta \tilde{\rho}_r^s + \tilde{a}_1 \Delta \tilde{I}_r^s + \Delta e_P \quad \text{(Expression 16)}$$

$$\Phi_{L1}^s = \tilde{\rho}_r^s - \tilde{a}_1 \tilde{I}_r^s + B_1^s + \lambda_1 \omega + e_L + \Delta \tilde{\rho}_r^s - \tilde{a}_1 \Delta \tilde{I}_r^s + \Delta e_L \quad \text{(Expression 17)}$$

$$R_{P2}^s = \tilde{\rho}_r^s + \tilde{a}_2 \tilde{I}_r^s + e_P - \Delta \tilde{\rho}_r^s + \tilde{a}_2 \Delta \tilde{I}_r^s - \Delta e_P \quad \text{(Expression 18)}$$

$$\Phi_{L2}^s = \tilde{\rho}_r^s - \tilde{a}_2 \tilde{I}_r^s + B_2^s + \lambda_2 \omega + e_L - \Delta \tilde{\rho}_r^s + \tilde{a}_2 \Delta \tilde{I}_r^s - \Delta e_L \quad \text{(Expression 19)}$$

Representing (Expression 16) to (Expression 19) as matrices, (Expression 16) to (Expression 19) are expressed as relational expressions indicated as (Expression 20) and (Expression 21).

$$\begin{pmatrix} R_{P1}^s \\ \Phi_{L1}^s \\ R_{P2}^s \\ \Phi_{L2}^s \end{pmatrix} = \begin{pmatrix} 1 & \tilde{\alpha}_1 & 0 & 0 \\ 1 & -\tilde{\alpha}_1 & 1 & 0 \\ 1 & \tilde{\alpha}_2 & 0 & 0 \\ 1 & -\tilde{\alpha}_2 & 0 & 1 \end{pmatrix} \begin{pmatrix} \tilde{\rho}_r^s \\ \tilde{I}_r^s \\ B_1^s \\ B_2^s \end{pmatrix} \quad \text{(Expression 20)}$$

$$+ \begin{pmatrix} e_P + \Delta \tilde{\rho}_r^s + \tilde{\alpha}_1 \Delta \tilde{I}_r^s + \Delta e_P \\ \lambda_1 \omega + e_L + \Delta \tilde{\rho}_r^s - \tilde{\alpha}_1 \Delta \tilde{I}_r^s + \Delta e_L \\ e_P - \Delta \tilde{\rho}_r^s - \tilde{\alpha}_2 \Delta \tilde{I}_r^s - \Delta e_P \\ \lambda_2 \omega + e_L - \Delta \tilde{\rho}_r^s + \tilde{\alpha}_2 \Delta \tilde{I}_r^s - \Delta e_L \end{pmatrix} \quad \text{(Expression 21)}$$

At this time, taking advantage of the fact that there is an inverse matrix to (Expression 20), it is possible to convert (Expression 20) and (Expression 21) into relational expressions indicated as (Expression 22) and (Expression 23) below, respectively, using a relational expression $\tilde{\alpha}_2 - \tilde{\alpha}_1 = 1$.

$$\begin{pmatrix} \tilde{\rho}_r^s \\ \tilde{I}_r^s \\ B_1^s \\ B_2^s \end{pmatrix} = \begin{pmatrix} \tilde{\alpha}_2 & 0 & -\tilde{\alpha}_1 & 0 \\ -1 & 0 & 1 & 0 \\ -(\tilde{\alpha}_1 + \tilde{\alpha}_2) & 1 & 2\tilde{\alpha}_1 & 0 \\ -2\tilde{\alpha}_2 & 0 & \tilde{\alpha}_1 + \tilde{\alpha}_2 & 1 \end{pmatrix} \begin{pmatrix} R_{P1}^s \\ \Phi_{L1}^s \\ R_{P2}^s \\ \Phi_{L2}^s \end{pmatrix} \quad \text{(Expression 22)}$$

$$+ \begin{pmatrix} e_P + (\tilde{\alpha}_1 + \tilde{\alpha}_2) + \Delta \tilde{\rho}_r^s + 2\tilde{\alpha}_1 \tilde{\alpha}_2 \Delta \tilde{I}_r^s + \\ (\tilde{\alpha}_1 + \tilde{\alpha}_2) \Delta e_P \\ -2\Delta \tilde{\rho}_r^s - (\tilde{\alpha}_1 + \tilde{\alpha}_2) \Delta \tilde{I}_r^s - 2\Delta e_P \\ \lambda_1 \omega - e_P + e_L + 4\tilde{\alpha}_1 \Delta \tilde{\rho}_r^s - 4\tilde{\alpha}_1 \tilde{\alpha}_2 \Delta \tilde{I}_r^s - \\ (4\tilde{\alpha}_1 + 1) \Delta e_P + \Delta e_L \\ \lambda_2 \omega - e_P + e_L + 4\tilde{\alpha}_2 \Delta \tilde{\rho}_r^s - 4\tilde{\alpha}_1 \tilde{\alpha}_2 \Delta \tilde{I}_r^s - \\ (4\tilde{\alpha}_2 + 1) \Delta e_P + \Delta e_L \end{pmatrix} \quad \text{(Expression 23)}$$

Let us now consider taking an average of remainders obtained from divisions dividing the phase biases in (Expression 22) (that is, the initial carrier biases $B_1^s$ and $B_2^s$), corresponding to state quantities of each of the antenna units 130 included in the multi-array antenna (that is, the antenna device 110), by the wavelengths of the wireless signals (that is, the signals L1 and L2), respectively. Denoting the operation of averaging the remainders of the modulo the wavelength $\lambda_i$ as "$<>_i$", the initial carrier phase biases $b_1^s$ and $b_2^s$ corresponding to the signals L1 and L2, respectively, can be expressed, based on (Expression 7), (Expression 22), and (Expression 23) above, as relational expressions (Expression 24) to (Expression 27) below.

$$\begin{pmatrix} b_1^s \\ b_2^s \end{pmatrix} = \begin{pmatrix} \langle -(\tilde{\alpha}_1 + \tilde{\alpha}_2) R_{P1}^s + \Phi_{L1}^s + 2\tilde{\alpha}_1 R_{P2}^s \rangle_1 \\ \langle (\tilde{\alpha}_1 + \tilde{\alpha}_2) R_{P2}^s + \Phi_{L2}^s - 2\tilde{\alpha}_1 R_{P1}^s \rangle_1 \end{pmatrix} \quad \text{(Expression 24)}$$

$$+ \begin{pmatrix} \langle -4\tilde{\alpha}_1 \Delta \tilde{\rho}_r^s - 4\tilde{\alpha}_1 \tilde{\alpha}_2 \Delta \tilde{I}_r^s \rangle_1 \\ \langle -4\tilde{\alpha}_2 \Delta \tilde{\rho}_r^s - 4\tilde{\alpha}_1 \tilde{\alpha}_2 \Delta \tilde{I}_r^s \rangle_2 \end{pmatrix} \quad \text{(Expression 25)}$$

$$+ \begin{pmatrix} \langle (-4\tilde{\alpha}_1 + 1) \Delta e_P + \Delta e_L \rangle_1 \\ \langle (-4\tilde{\alpha}_2 + 1) \Delta e_P + \Delta e_L \rangle_2 \end{pmatrix} \quad \text{(Expression 26)}$$

$$+ \begin{pmatrix} \langle -e_P + e_L \rangle_1 \\ \langle -e_P + e_L \rangle_2 \end{pmatrix} \quad \text{(Expression 27)}$$

Among (Expression 24) to (Expression 27) mentioned above, the error terms represented by (Expression 25) to (Expression 27) will now be discussed.

To begin with, assuming that the size of the multi-antenna is one meter by one meter, and taking the orders of the size of the multi-array antenna and of the distance between the antenna and the satellite (about 20,200 kilometers) into consideration, the waves being incident on the respective antennas can be considered to be approximately in parallel. Furthermore, because the basic units (the antenna units 130) are arranged alternatingly in such a manner that the antenna element 131 corresponding to the L1 signal is positioned adjacently to the antenna element 133 corresponding to the L2 signal, the wave path difference will be inversed in the adjacent units.

Therefore, $\Delta\tilde{\rho}_r^s$ and $\Delta\tilde{I}_r^s$ indicated in (Expression 25) are mostly cancelled out.

For (Expression 26) above, too, it is possible to consider the multi-path waves to be incident in parallel. Therefore, by arranging the basic units alternatingly in such a manner that the antenna element 131 corresponding to the L1 signal is positioned adjacently to the antenna element 133 corresponding to the L2 signal, the first terms in (Expression 14) and (Expression 15) are mostly cancelled out. Furthermore, because the second terms in (Expression 14) and (Expression 15) can be statistically reduced in the order of 100 times or so, as a result of the averaging operation described above, these terms can be rendered ignorable.

In (Expression 27) mentioned above, because the second terms in (Expression 10) and (Expression 11) can be reduced sufficiently, as a result of the averaging operation described above, these terms can be rendered ignorable. Furthermore, the multi-path bias indicated in the first terms of (Expression 10) and (Expression 11) can be made ignorable by applying an existing technique for alleviating the effect of a multi-path bias. As a more specific example, the effect of the multi-path bias can be suppressed sufficiently by providing an open environment above the antenna device 110, using data of a satellite at a high elevation angle, and implementing a countermeasure with choking.

Based on these results, (Expression 24) to (Expression 27) can be converted into a relational expression indicated in (Expression 28) below, with the effects of the error terms removed.

$$\begin{pmatrix} b_1^s \\ b_2^s \end{pmatrix} = \begin{pmatrix} \langle -(\alpha_1 + \alpha_2)R_{P1}^s + \Phi_{L1}^s + 2\alpha_1 R_{P2}^s \rangle_1 \\ \langle (\alpha_1 + \alpha_2)R_{P2}^s + \Phi_{L2}^s - 2\alpha_1 R_{P1}^s \rangle_1 \end{pmatrix} \quad \text{(Expression 28)}$$

In other words, the estimating unit 190 is enabled to estimate the initial carrier phase biases $b_1^s$ and $b_2^s$ based on (Expression 28) mentioned above, using the P1 code pseudo-range $R_{P1}^s$, the P2 code pseudo-range $R_{P2}^s$, the L1 carrier phase $\phi_{L1}^s$, and the L2 carrier phase $\phi_{L2}^s$ as inputs. For example, FIG. 6 is a schematic illustrating an example of an algorithm related to the estimation of the initial carrier phase biases in the satellite positioning system according to the embodiment, illustrating an example of the process in which the initial carrier phase biases $b_1^s$ and $b_2^s$ are estimated based on (Expression 28) above.

It is also possible to estimate the initial carrier biases $B_1^s$ and $B_2^s$, instead of the initial carrier phase biases $b_1^s$ and $b_2^s$, as the carrier-related information of the L1 signal and the L2 signal. In such a case, the relational expressions for the initial carrier bias $B_1^s$ and $B_2^s$ can be obtained by performing an averaging operation and removing the error terms, in the manner described above, but without performing the divisions of the phase biases by the respective wireless signal wavelengths, in (Expression 22) and (Expression 23) above.

In the manner described above, the estimating unit 190 estimates the carrier-related information of the L1 signal and the L2 signal (e.g., the initial carrier phase biases $b_1^s$ and $b_2^s$), and outputs the estimation results to the transmitter device 201, as at least a part of the electronic reference point information. The estimating unit 190 may also acquire information other than the carrier-related information based on the reception results of the L1 signal and the L2 signal, being received by the electronic reference point 100, and outputs the information to the transmitter device 201, as at least a part of the electronic reference point information. In the estimating unit 190, the part that acquires various types of information from the electronic reference point 100 corresponds to an example of an "acquiring unit". The part that estimates the carrier-related information based on the acquired various types of information corresponds to an example of an "estimating unit".

The transmitter device 201 includes the correction data generating unit 203 and a transmission processing unit 205.

The correction data generating unit 203 acquires electronic reference point information including the estimation results of the carrier-related information of the L1 signal and the L2 signal, from the estimating unit 190. The correction data generating unit 203 then generates positioning correction data that is to be used by the positioning device (e.g., the positioning device 300 illustrated in FIG. 1) in positioning the satellite, based on the acquired electronic reference point information. The correction data generating unit 203 then outputs the generated positioning correction data to the transmission processing unit 205.

The transmission processing unit 205 acquires the positioning correction data from the correction data generating unit 203, and generates a transmission signal by applying a predetermined modulation process to the acquired positioning correction data. The transmission processing unit 205 then transmits the transmission signal (that is, the modulated positioning correction data) to the quasi-zenith satellite 500 (uplink) via a predetermined communicating unit (e.g., the antenna of the center station 200).

The configuration of the system 10 described above is merely one example, and the configuration of the system 10 is not limited to that illustrated in FIG. 5, as long as the functions described above are provided. For example, the position where the estimating unit 190 is provided is not limited to a particular position. As a specific example, the estimating unit 190 may also be provided as a part of the electronic reference point 100. As another example, the estimating unit 190 may also be provided as a part of the transmitter device 201. As another example, the estimating unit 190 may also be provided to another device (e.g., a server) that is different from the electronic reference point 100 and the transmitter device 201. Furthermore, the estimating unit 190 may perform the process of estimating the carrier-related information corresponding each of the L1 signal and the L2 signal described above, for a plurality of the electronic reference points 100. Furthermore, the function corresponding to the estimating unit 190 may be implemented by a plurality of devices (e.g., servers) operating in coordination with one another.

In the system 10, an apparatus particularly including the configuration corresponding to the estimating unit 190 corresponds to an example of an "information processing apparatus". The method for estimating the carrier-related information, as explained above as a process performed by the system 10 (by the estimating unit 190, in particular), corresponds to an example of an "information processing method". The electronic reference point 100 corresponds to an example of a "communication device".

Explained above is an example of the functional configuration of the satellite positioning system according to the embodiment, with a particular focus on the process for estimating the carrier-related information of the wireless signals received from a GPS satellite, the process being performed based on the reception results of the wireless signals from the GPS satellite, being received by the electronic reference point.

<3.3. Modification>

An example of a pattern in which the antenna units 130 are arranged in the antenna device 110, in the electronic reference point 100, will now be explained, as modifications of the satellite positioning system according to the embodiment.

In the antenna device 110 used in the electronic reference point 100 according to the embodiment, two antenna units 130 positioned adjacently to each other at least in a part of the y direction are arranged in such a manner that the antenna element 131 of one of the antenna units 130 is positioned adjacently to the antenna element 133 in the other antenna unit 130 in the y direction. As long as this condition is met, the pattern in which the antenna units 130 are arranged in the antenna device 110 is not limited to any particular pattern.

Figure 7:
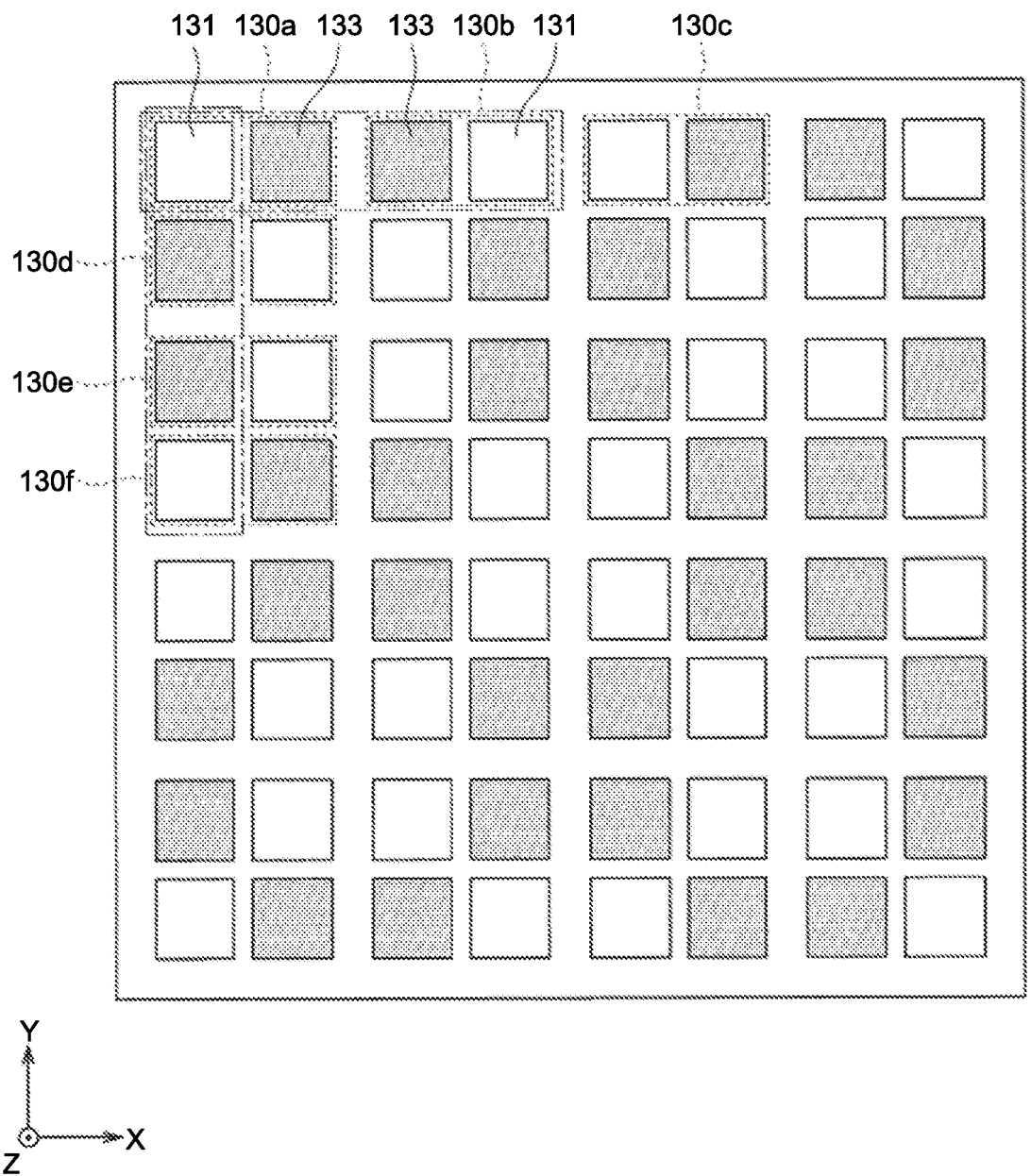
FIG. 7 is a schematic for explaining an example of a general configuration of an antenna device used in an electronic reference point according to a modification.

For example, FIG. 7 is a schematic for explaining an example of a general configuration of the antenna device used in the electronic reference point according to a modification, illustrating an example of the pattern in which the antenna units 130 are arranged.

In the example illustrated in FIG. 7, two antenna units 130 positioned adjacently to each other in the x direction are arranged in such a manner that one of the antenna elements 131 and 133 in one of such antenna units 130 is positioned adjacently to the other antenna element in the other antenna unit 130 in the x direction, in the same manner as the example illustrated in FIG. 4. For example, in the example illustrated in FIG. 7, the antenna units 130*a* and 130*b* are arranged in such a manner that the antenna element 133 in the antenna unit 130*a* is positioned adjacently to the antenna element 133 in the antenna unit 130*b*, and the antenna units 130*b* and 130*c* are arranged in such a manner that the antenna element 131 in the antenna unit 130*b* is positioned adjacently to the antenna element 131 in the antenna unit 130*c*.

In the example illustrated in FIG. 7, however, the pattern in which the antenna units 130 are arranged in the y direction (that is, the pattern in which the antenna elements 131 and 133 are arranged) is different from the example illustrated in FIG. 4. Specifically, the antenna units 130*a* and 130*d* are arranged in such a manner that the antenna element 131 in one of the antenna units 130*a* and 130*d* is positioned adjacently to the antenna element 133 in the other, in the y direction. The same arrangement applies to the antenna units 130*e* and 130*f*. However, in the example illustrated in FIG. 7, the antenna unit 130*d* and the antenna unit 130*e* that is positioned on the opposite side of the antenna unit 130*a* with respect to the antenna unit 130*d*, are arranged in a different pattern in the y direction, from the example illustrated in FIG. 4. In other words, the antenna units 130*d* and 130*e* are arranged in such a manner that one of the antenna elements 131 and 133 in one of the antenna units 130*d* and 130*e* is positioned adjacently to the one antenna element 131 or 133 in the other one of the antenna units 130*d* and 130*e* in x direction. In the description above, when the antenna unit 130*d* is used as the "first antenna unit" and the antenna unit 130*a* is used as the "second antenna unit", the antenna unit 130*e* corresponds to an example of a "fifth antenna unit".

Figure 8:
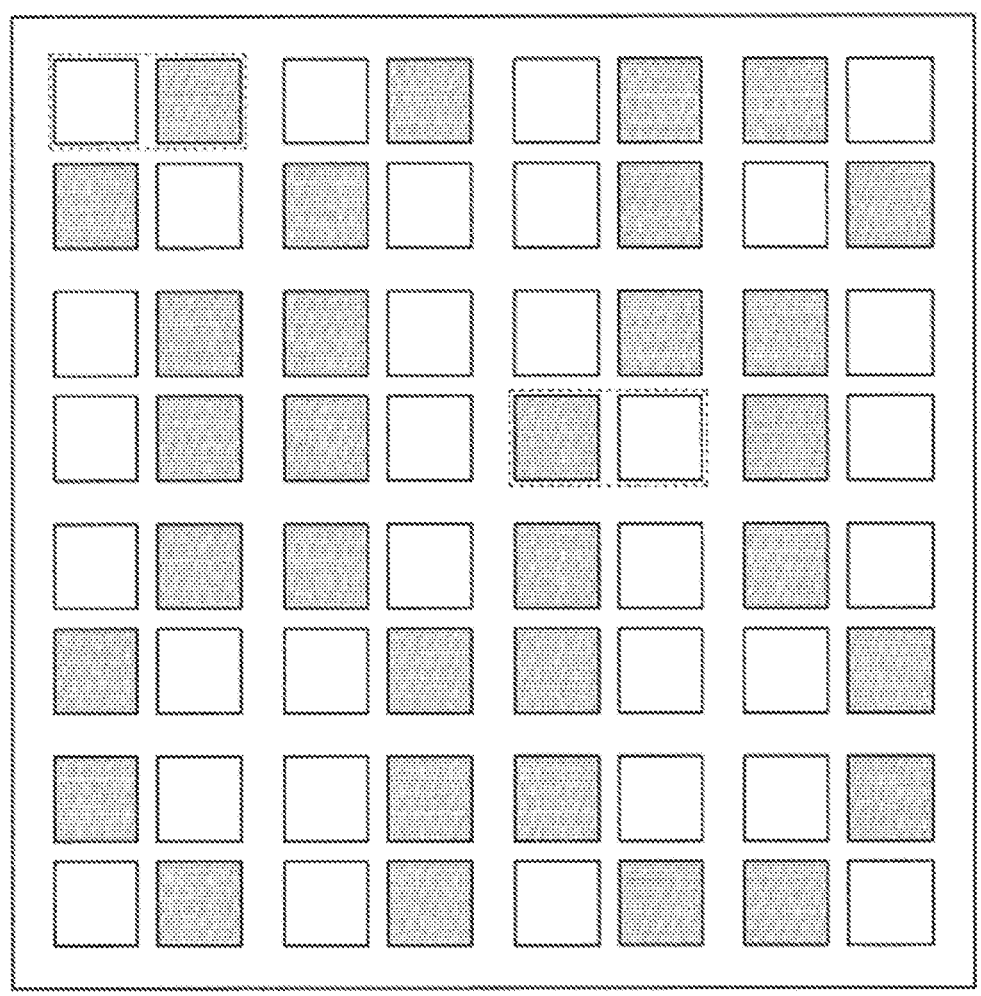
FIG. 8 is a schematic for explaining an example of a general configuration of the antenna device used in the electronic reference point according to the modification.

FIG. 8 is a schematic for explaining an example of a general configuration of the antenna device used in the electronic reference point according to the modification, illustrating another example of the pattern in which the antenna units 130 are arranged. In the example illustrated in FIG. 8, some randomness is given to the pattern in which the antenna units 130 are arranged. Specifically, in the example illustrated in FIG. 8, pairs of the antenna units 130 with their antenna elements 131 and 133 oppositely positioned are arranged randomly in the x direction. In such a configuration as well, the satellite positioning system according to the embodiment can be implemented, as long as two antenna units 130 positioned adjacently to each other at least in a part of the y direction are arranged in such a manner that the antenna element 131 of one of the antenna units 130 is positioned adjacently to the antenna element 133 of the other antenna unit 130 in the y direction.

Explained above, as the modification of the satellite positioning system according to the embodiment, is an example of the pattern in which the antenna units 130 in the antenna device 110 included in the electronic reference point 100 are arranged.

4. Application Examples

Explained now as application examples of the satellite positioning system according to the embodiment is an example of how the positioning device 300 uses the carrier-related information (e.g., the carrier phase initial bias) of the wireless signals, the carrier-related information being the correction information corresponding to the reception results of wireless signals from the GPS satellite 400, being received by the electronic reference point 100. A different application method is used depending on the type of the positioning device 300. Therefore, explained below are examples in which the positioning device 300 is a positioning device supporting a single frequency (L1), and in which the positioning device 300 is a positioning device supporting a dual-frequency (L1/L2). In the explanation hereunder, use of a typical PPP-RTK positioning algorithm is assumed. Therefore, a process related to the positioning algorithm will be only generally explained, and detailed explanations thereof will be omitted.

<4.1. Application Example 1: Case of Single-frequency Positioning Device>

Figure 9:
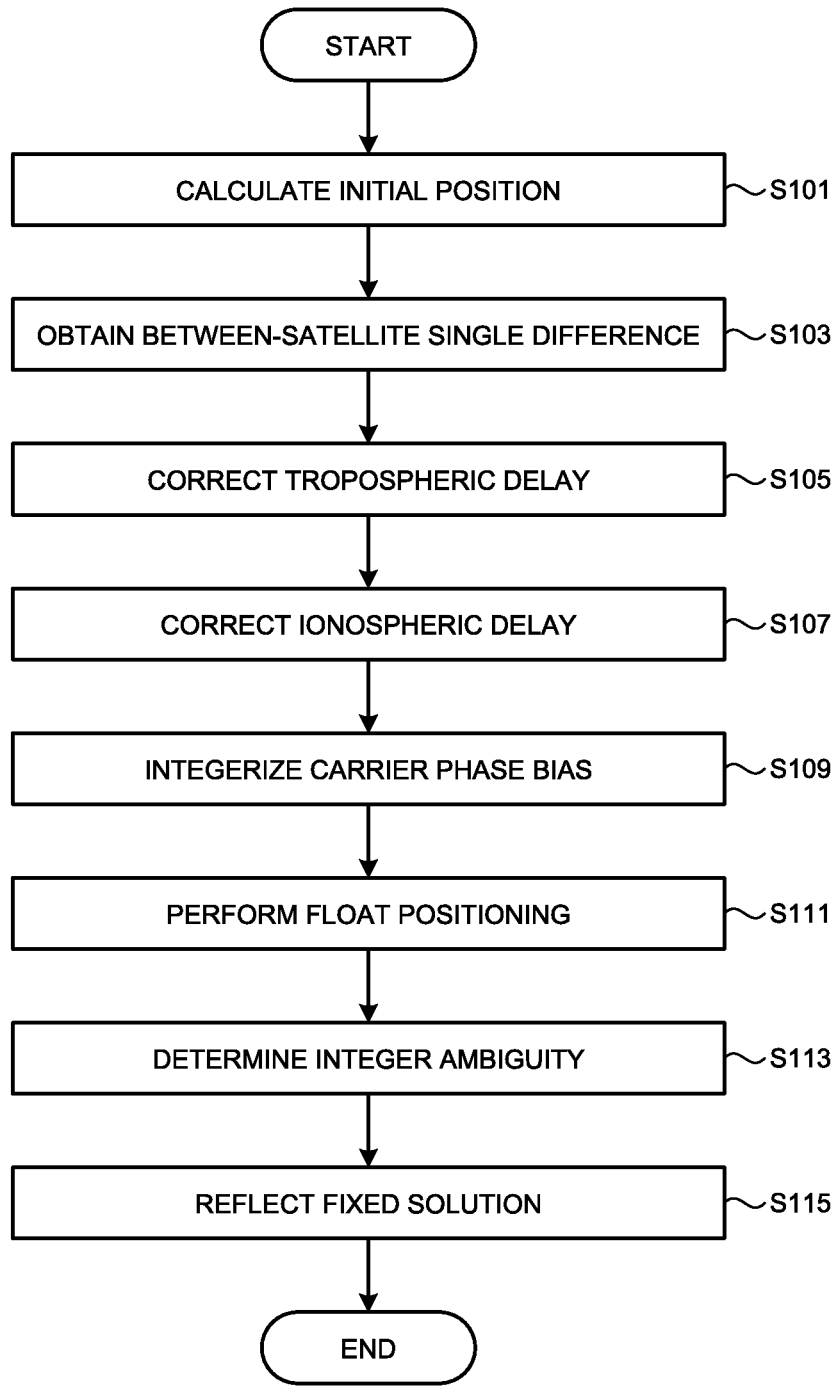
FIG. 9 is a flowchart illustrating an example of the sequence of a series of processes performed by a positioning apparatus according to an application example 1.

To begin with, as an application example 1, an example of the sequence of a series of processes related to the satellite positioning performed by a positioning device, when a single-frequency positioning device is used as the positioning device, will now be explained with reference to FIG. 9. FIG. 9 is a flowchart illustrating an example of the sequence of a series of processes performed by the positioning device according to the application example 1.

To begin with, the positioning device 300 calculates a general position of the positioning device 300 (that is, the receiver position), via a point positioning calculation, for example (S101). The positioning device 300 also obtains a between-satellite single difference in the carrier phase, using a zenith satellite as a base point (S103).

The positioning device 300 then corrects a tropospheric delay introduced by dry gas and humid gas, based on a pre-estimated model (S105). The positioning device 300 also corrects the ionospheric delay, based on correction information provided by a predetermined organization or service (S107).

The positioning device 300 then corrects the carrier phase based on the positioning correction data received from the quasi-zenith satellite 500 (downlink) (S109). At this time, the positioning device 300 can use the carrier-related information (e.g., the initial carrier phase bias) included in the correction data for this side, in correcting the carrier phase. The carrier-related information is estimated based on the process explained with reference to FIGS. 5 and 6.

The positioning device 300 then obtains a float solution by performing a positioning calculation using a Kalman filter (S111). The positioning device 300 then estimates an integer bias using a Lambda method (an integer least squares method), for example (S113). The positioning device 300 then fixes the integer bias, and reflects the fixed solution to the positioning result (S115).

Explained above, with reference to FIG. 9, as the application example 1, is an example of the sequence of a series of processes related to the satellite positioning performed by the positioning device, when the single-frequency positioning device is used as the positioning device.

<4.2. Application Example 2: Case of Dual-frequency Positioning Device>

Figure 10:
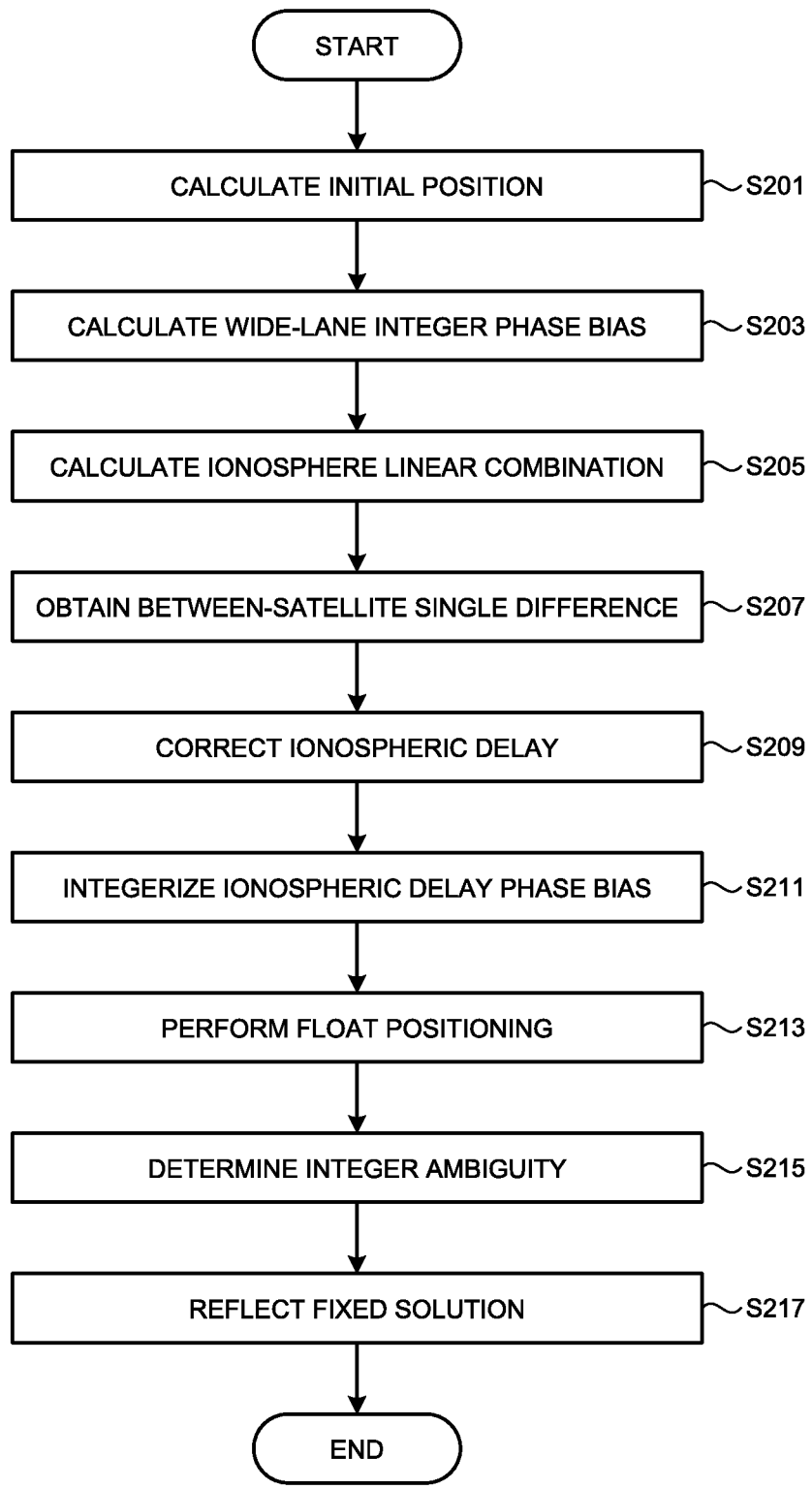
FIG. 10 is a flowchart illustrating an example of the sequence of a series of processes performed by a positioning apparatus according to an application example 2.

As an application example 2, an example of the sequence of a series of processes related to the satellite positioning performed by the positioning device, when a dual-frequency positioning device is used as the positioning device, will now be explained with reference to FIG. 10. FIG. 10 is a flowchart illustrating an example of the sequence of a series of processes performed by the positioning device according to the application example 2.

To begin with, the positioning device 300 calculates a general position of the positioning device 300 (that is, the receiver position), via a point positioning calculation, for example (S201). The positioning device 300 then estimates a Wide-lane (WL) integer phase bias, based on Melbourne-Wubbena linear combination (S203). The positioning device 300 also calculates an ionosphere (IF) linear combination for the L1/L2 carrier phases (S205). The positioning device 300 then obtains a between-satellite single difference in the corrected IF linear combination carrier phase, using a zenith satellite as a base point (S207).

The positioning device 300 then corrects a tropospheric delay introduced by the dry gas and the humid gas, based on a pre-estimated model (S209). The positioning device 300 then corrects the IF linear combination carrier phase, based on the WL integer phase bias previously obtained, and on the positioning correction data (downlink) received from the quasi-zenith satellite 500 (S211). At this time, the positioning device 300 can use the carrier-related information (e.g., the initial carrier phase bias) included in the correction data for this side, in correcting the IF linear combination carrier phase. The carrier-related information is estimated based on the process explained with reference to FIGS. 5 and 6.

The positioning device 300 then obtains a float solution by performing a positioning calculation using a Kalman filter (S213). The positioning device 300 also estimates an integer bias using the Lambda method (an integer least squares method), for example (S215). The positioning device 300 then fixes the integer bias, and reflects the fixed solution to the positioning result (S217).

Explained above, with reference to FIG. 10, as the application example 2 is an example of the sequence of a series of processes related to the satellite positioning performed by the positioning device, when a dual-frequency positioning device is used as the positioning device.

5. Hardware Configuration

Figure 11:
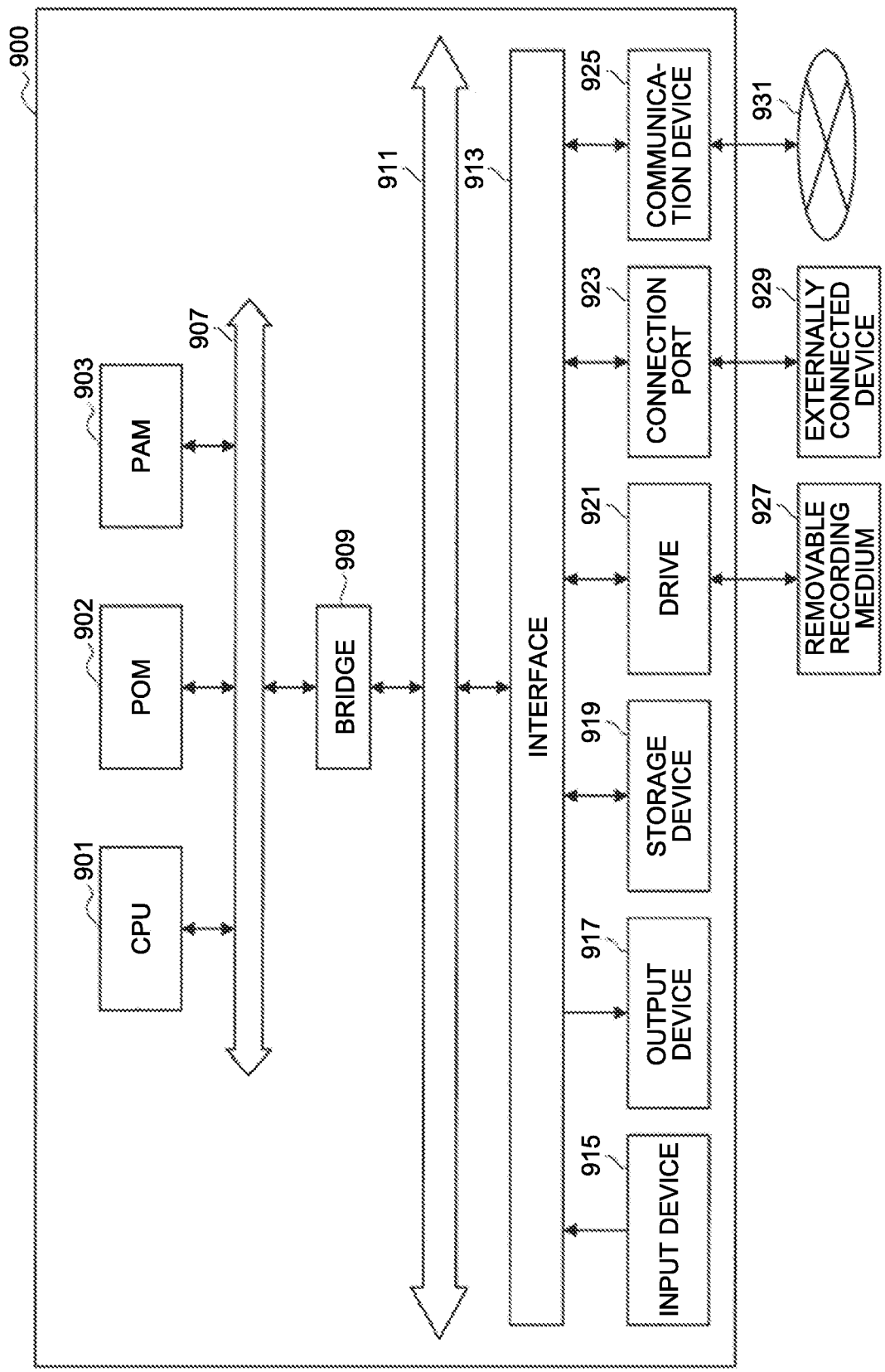
FIG. 11 is a functional block diagram illustrating an example of a hardware configuration of an information processing apparatus implementing the system according to one embodiment of the present disclosure.

An example of a hardware configuration of an information processing apparatus implementing the system according to one embodiment of the present disclosure will now be explained in detail with reference to FIG. 11. FIG. 11 is a functional block diagram illustrating an example of a hardware configuration of an information processing apparatus implementing the system according to the one embodiment of the present disclosure.

This information processing apparatus 900 implementing the system according to the embodiment mainly includes a central processing unit (CPU) 901, a read-only memory (ROM) 902, and a random access memory (RAM) 903. The information processing apparatus 900 also includes a host bus 907, a bridge 909, an external bus 911, an interface 913, an input device 915, an output device 917, a storage device 919, a drive 921, a connection port 923, and a communication device 925.

The CPU 901 functions as a processor and a control system, and controls the entire or a part of the operations performed in the information processing apparatus 900, following various computer programs recorded on the ROM 902, the RAM 903, the storage device 919, or a removable recording medium 927. The ROM 902 stores therein computer programs, operation parameters, and the like that are used by the CPU 901. The RAM 903 temporarily stores therein a computer program used by the CPU 901, and parameters or the like that go through a change, as appropriate, as the computer program is executed. These components are connected to one another via the host bus 907 provided as an internal bus such as a CPU bus. For example, the estimating unit 190 and the correction data generating unit 203 illustrated in FIG. 5 may be implemented by the CPU 901.

The host bus 907 is connected to the external bus 911, such as a Peripheral Component Interconnect/Interface (PCI) bus, via the bridge 909. The input device 915, the output device 917, the storage device 919, the drive 921, the connection port 923, and the communication device 925 are connected to the external bus 911 via the interface 913.

The input device 915 may be an operation unit, such as a mouse, a keyboard, a touch panel, a button, a switch, a level, and a pedal, operated by a user. The input device 915 may also be a remote control unit (what is called a remote controller) using infrared or other radio waves, for example, or may be an externally connected device 929 such as a mobile phone or a personal digital assistant (PDA) supporting the operations of the information processing apparatus 900. The input device 915 includes an input control circuit that generates an input signal, based on the information input by a user using the operation unit, for example, and outputs the input signal to the CPU 901. A user of the information processing apparatus 900 can input various types of data, or give an instruction for a processing operation to the information processing apparatus 900, by operating the input device 915.

The output device 917 is provided as a device capable of visually or auditorily notifying a user of acquired information. Examples of such a device includes a display device such as a cathode-ray tube (CRT) display device, a liquid crystal display device, a plasma display device, and an electroluminescent (EL) display device, and a lamp, a sound output device such as a speaker and a headset, and a printer device. The output device 917 outputs results of various processes performed by the information processing apparatus 900, for example. Specifically, the display device displays a result of various processes performed by the information processing apparatus 900, as a text or an image. The sound output device, by contrast, converts an audio signal such as replayed sound data or acoustic data into an analog signal, and outputs the analog signal.

The storage device 919 is a data storage device implemented as a storage unit in the information processing apparatus 900, as an example. The storage device 919 is implemented as a magnetic storage device, such as a hard disk drive (HDD), a semiconductor storage device, an optical storage device, or a magneto-optical storage device. This storage device 919 stores therein computer programs executed by the CPU 901 and various types of data, for example.

The drive 921 is a reader/writer for a recording medium, and is provided internal of, or externally connected to the information processing apparatus 900. The drive 921 reads information recorded in the removable recording medium 927 such as a magnetic disk, an optical disc, a magneto-optical disc, or a semiconductor memory, mounted thereon, and outputs the information to the RAM 903. The drive 921 is also capable of writing information to the removable recording medium 927 such as a magnetic disk, an optical disc, a magneto-optical disc, and a semiconductor memory, mounted thereon. The removable recording medium 927 is, for example, a digital versatile disc (DVD) medium, a high-definition (HD)-DVD medium, or a Blu-ray (registered trademark) medium. The removable recording medium 927 may also be a CompactFlash (registered trademark) (CF), a flash memory, or a Secure Digital (SD) memory card. The removable recording medium 927 may also be an integrated circuit (IC) card on which a non-contact IC chip is implemented, or an electronic device, for example.

The connection port 923 is a port for directly connecting to the information processing apparatus 900. Examples of the connection port 923 include a Universal Serial Bus (USB) port, an IEEE1394 port, a Small Computer System Interface (SCSI) port. Other examples of the connection port 923 include an RS-232C port, an optical audio terminal, a High-Definition Multimedia Interface (HDMI) (registered trademark) port. By connecting the externally connected device 929 to the connection port 923, the information processing apparatus 900 performs operations such as acquiring various types of data directly from the externally connected device 929, and providing various types of data to the externally connected device 929.

The communication device 925 is a communication interface implemented as a communication device, for example, that establishes a connection to a communication network 931. Examples of the communication device 925 include communication cards for a wired or wireless local area network (LAN), Bluetooth (registered trademark), or wireless USB (WUSB). The communication device 925 may be a router for optical communications, an asymmetric digital subscriber line (ADSL) router, or modems for various types of communications. The communication device 925 is capable of transmitting and receiving signals to and from the Internet or another communication device, for example, over a predetermined protocol such as TCP/IP. The communication network 931 connected to the communication device 925 is a network or the like connected over the wire or wirelessly, and may be the Internet, a home LAN, an infrared communication, a radio-wave communication, or a satellite communication, for example. For example, the transmission processing unit 205 illustrated in FIG. 5 may be implemented as the communication device 925.

An example of the hardware configuration capable of implementing the information processing apparatus 900 that implements the system according to the embodiment of the present disclosure is explained above. The components described above may be implemented using a general-purpose member, or hardware specialized for the functions of the components. Hence, the hardware configuration to be used may be changed as appropriate, depending of the level of technologies at the time at which the embodiment is implemented. It should be needless to say that various configurations of the information processing apparatus 900 implementing the system are included, although not illustrated in FIG. 11.

It is also possible to prepare a computer program for implementing the functions of the information processing apparatus 900 implementing the information processing system according to the embodiment, and implements the computer program on a personal computer or the like. Furthermore, it is also possible to provide a computer-readable recording medium storing therein the computer program. Examples of the recording medium include a magnetic disk, an optical disc, a magneto-optical disc, and a flash memory. Furthermore, it is also possible to distribute the computer program over a network, for example, without using any recording medium. Furthermore, the number of computers on which the computer program is executed is not limited to a particular number. For example, the computer program may be executed by a plurality of computers (e.g., a plurality of servers) operating in coordination with one another.

6. Conclusion

As explained above, the electronic reference point according to the embodiment (communication device) includes a plurality of antenna units that are arranged in an array. Each of the antenna units includes the first antenna element, the second antenna element, the first receiving unit, and the second receiving unit. The first and the second antenna elements are arranged in the first direction. The first receiving unit receives the first wireless signal used in satellite positioning, via the first antenna element. The second receiving unit receives the second wireless signal used in the satellite positioning, via the second antenna element. Among the antenna units, the first and the second antenna units positioned adjacently to each other in the second direction being perpendicular to the first direction are arranged in such a manner that the first antenna element in one of the first and the second antenna units is positioned adjacently to the second antenna element in the other one of the first antenna unit and the second antenna unit in the second direction.

Furthermore, the information processing apparatus according to the embodiment acquires reception results of the first wireless signal and of the second wireless signal from the electronic reference point. The information processing apparatus estimates carrier-related information of at least one of the first wireless signal and the second wireless signal controlled on the satellite side, based on the acquired reception results. As a specific example, the information processing apparatus estimates at least one of the initial carrier bias and the initial carrier phase bias of the first wireless signal and the second wireless signal, based on a code pseudo-range and a carrier phase of each of the first wireless signal and second the wireless signal.

As described above, the electronic reference point according to the embodiment is enabled to support multiple frequencies by using a combination of a plurality of antennas and receivers each of which supports a single frequency. With the satellite positioning system according to the embodiment having the configuration described above, the implementation costs of the electronic reference point can be reduced further, compared with a configuration in which antennas and receivers with a multi-frequency support are used. Therefore, at the time of implementing a satellite positioning system using the PPP-RTK technique, a wide and dense network of electronic reference points can be implemented at lower costs. Furthermore, even with the use of the electronic reference point described above, it is possible to estimate information for generating positioning correction data (e.g., the initial carrier bias and the initial carrier phase bias) when the satellite positioning is to be performed based on the PPP-RTK technique, as described above.

As explained above, although explained in detail with reference to the appended drawings is an embodiment of the present disclosure, the technical scope of the present disclosure is not limited to the embodiment. It is clear that those who have ordinary knowledge in the technical field of the present disclosure can come up with various examples of changes and modifications, within the scope of a technical idea as defined in the appended claims, and naturally, it is understood that such changes and modifications fall within the technical scope of the present disclosure.

Furthermore, advantageous effects described herein are only explanatory and exemplary, and are not limiting. In other words, it is still possible that the technology according the present disclosure exerts any other advantageous effects that are clear to those skilled in the art based on the description herein, in addition to, or in replacement of the advantageous effects described above.

The following configurations also fall within the technical scope of the present disclosure:

(1)
A communication device comprising a plurality of antenna units that are arranged in an array, wherein
each of the antenna units comprises:
a first antenna element and a second antenna element that are arranged in a first direction;
a first receiving unit that receives a first wireless signal used in satellite positioning, via the first antenna element; and
a second receiving unit that receives a second wireless signal used in the satellite positioning, via the second antenna element, and
among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

(2)
The communication device according to (1), wherein
among the antenna units, a third and a fourth antenna units positioned adjacently to each other in the first direction are arranged in such a manner that one of the third and the fourth antenna elements in one of the third and the fourth antenna units is positioned adjacently to the one of the first and the second antenna elements in the other antenna unit in the first direction.

(3)
The communication device according to (1) or (2), wherein the first antenna unit, and a fifth antenna unit positioned adjacently to the first antenna unit on an opposite side of the second antenna unit with respect to the first antenna unit, are arranged in such a manner that the first antenna element in one of the first and the fifth antenna units is positioned adjacently to the first antenna element in the other antenna unit in the second direction.

(4)
The communication device according to any one of (1) to (3), further comprising a time measuring unit that detects a timing at which the first wireless signal is received by the first receiving unit, and a timing at which the second wireless signal is received by the second receiving unit.

(5)
The communication device according to (4), wherein the time measuring unit is shared between two or more of the antenna units.

(6)
An information processing apparatus comprising:
an acquiring unit that acquires reception results of a first wireless signal and of a second wireless signal that are used in satellite positioning, the first wireless signal and the second wireless signal being received by each of a plurality of antenna units that are arranged in an array; and
an estimating unit that estimates carrier-related information of at least one the first wireless signal and the second wireless signal controlled on a satellite side, based on the acquired reception results, wherein
each of the antenna units comprises:
a first antenna element and a second antenna element that are arranged in a first direction;
a first receiving unit that receives a first wireless signal, via the first antenna element; and
a second receiving unit that receives the second wireless signal, via the second antenna element, and
among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

(7)
The information processing apparatus according to (6), wherein the estimating unit estimates the carrier-related information, based on a code pseudo-range and a carrier phase of each of the first wireless signal and the second wireless signal.

(8)
The information processing apparatus according to (7), wherein the carrier-related information includes at least one of an initial carrier bias and an initial carrier phase bias.

(9)
The information processing apparatus according to (8), wherein the estimating unit calculates an initial carrier phase bias of at least one of the first wireless signal and the second wireless signal based on a remainder of dividing the initial carrier bias of the wireless signal by a wavelength of the wireless signal.

(10)
The information processing apparatus according to any one of (7) to (9), wherein the estimating unit calculates the carrier-related information of each of the first wireless signal and the second wireless signal, based on an average of information that is based on the code pseudo-range and the carrier phase of each of the first wireless signal and the second wireless signal, the average being taken among the antenna units.

(11)

The information processing apparatus according to any one of (6) to (10), wherein, based on reception results of the first wireless signal and the second wireless signal received by, using one of the first antenna element and the second antenna element as a reference, each of a plurality of the other antenna elements arranged in different directions with respect to the one antenna element, an error in at least one of a tropospheric delay and an ionospheric delay included in the reception result received at each of the other antenna elements is cancelled out.

(12)

An information processing method causing a computer to execute:

acquiring reception results of a first wireless signal and a second wireless signal that are used in satellite positioning, and that are received by each of a plurality of antenna units that are arranged in an array, each of the antenna units including a first antenna element and a second antenna element that are arranged in a first direction, a first receiving unit that receives the first wireless signal via the first antenna element, and a second receiving unit that receives the second wireless signal via the second antenna element; and estimating carrier-related information of at least one of the first wireless signal and the second wireless signal that are controlled on a satellite side, based on the acquired reception results, wherein among the antenna units, a first and a second antenna units positioned adjacently to each other in a second direction being perpendicular to the first direction are arranged in such a manner that the first antenna element in one of the first and the second antenna units is positioned adjacently to the second antenna element in the other antenna unit in the second direction.

REFERENCE SIGNS LIST 1 satellite positioning system
10 system
100 electronic reference point
110 antenna device
130 antenna unit
131, 133 antenna element
135, 137 receiver
139 receiver clock
190 estimating unit
200 center station
201 transmitter device
203 correction data generating unit
205 transmission processing unit
300 positioning device
400 GPS satellite
500 quasi-zenith satellite

The invention claimed is:

1. A communication device, comprising:
a plurality of antennae in an array, wherein
each antenna of the plurality of antennae comprises:
a first antenna element and a second antenna element, wherein each of the first antenna element and the second antenna element is in a first direction;
a first receiver configured to receive a first wireless signal used in satellite positioning, via the first antenna element; and
a second receiver configured to receive a second wireless signal used in the satellite positioning, via the second antenna element, and
among the plurality of antennae, a first antenna adjacent to a second antenna in a second direction perpendicular to the first direction are such that the first antenna element in one of the first antenna or the second antenna is adjacent to the second antenna element in other of the first antenna or the second antenna in the second direction.

2. The communication device according to claim 1, wherein
among the plurality of antennae, a third antenna adjacent to a fourth antenna in the first direction are such that one of the first antenna element or the second antenna element in one of the third antenna or the fourth antenna is adjacent to the one of the first antenna element or the second antenna element in the other of the first antenna or the second antenna in the first direction.

3. The communication device according to claim 1, wherein
the first antenna, and a third antenna adjacent to the first antenna on an opposite side of the second antenna with respect to the first antenna, are in such that the first antenna element in one of the first antenna or the third antenna is adjacent to the first antenna element in the other of the first antenna or the second antenna in the second direction, and
the plurality of antennae includes the third antenna.

4. The communication device according to claim 1, further comprising a receiver clock configured to detect a timing at which the first wireless signal is received by the first receiver, and a timing at which the second wireless signal is received by the second receiver.

5. The communication device according to claim 4, wherein the receiver clock is shared between at least two antennae the plurality of antennae.

6. An information processing apparatus, comprising:
a central processing unit (CPU) configured to:
acquire reception results of a first wireless signal and of a second wireless signal that are used in satellite positioning, wherein the first wireless signal and the second wireless signal being received by each antenna of a plurality of antennae in an array; and
estimate carrier-related information of at least one the first wireless signal or the second wireless signal controlled on a satellite side, based on the acquired reception results, wherein
each antenna of the plurality of antennae comprises:
a first antenna element and a second antenna element, wherein each of the first antenna element and the second antenna element is in a first direction;
a first receiver configured to receive the first wireless signal, via the first antenna element; and
a second receiver configured to receive the second wireless signal, via the second antenna element, and
among the plurality of antennae, a first antenna adjacent to a second antenna in a second direction perpendicular to the first direction are such that the first antenna element in one of the first antenna or the second antenna units is adjacent to the second antenna element in other of the first antenna or the second antenna in the second direction.

7. The information processing apparatus according to claim 6, wherein the CPU is further configured to estimate the carrier-related information, based on a code pseudo-range and a carrier phase of each of the first wireless signal and the second wireless signal.

8. The information processing apparatus according to claim 7, wherein the carrier-related information includes at least one of an initial carrier bias or an initial carrier phase bias.

9. The information processing apparatus according to claim 8, wherein the CPU is further configured to calculate the initial carrier phase bias of at least one of the first wireless signal or the second wireless signal based on a remainder of dividing the initial carrier bias of corresponding wireless signal by a wavelength of the corresponding wireless signal.

10. The information processing apparatus according to claim 7, wherein
the CPU is further configured to calculate the carrier-related information of each of the first wireless signal or the second wireless signal, based on an average of information that is based on the code pseudo-range and the carrier phase of each of the first wireless signal and the second wireless signal, and
the average is taken among the plurality of antennae.

11. The information processing apparatus according to claim 6, wherein, based on the reception results of the first wireless signal and the second wireless signal received by, using one of the first antenna element and the second antenna element as a reference, each of a plurality of other antenna elements arranged in different directions with respect to one antenna element, an error in at least one of a tropospheric delay and an ionospheric delay included in the reception results received at each of the other antenna elements is cancelled out.

12. A non-transitory computer-readable medium having stored thereon computer-executable instructions that, when executed by a processor, cause the processor to execute operations, the operations comprising:
acquiring reception results of a first wireless signal and a second wireless signal that are used in satellite positioning, wherein
the first wireless signal and the second wireless signal are received by each antenna of a plurality of antennae that are in an array, and
each antenna of the plurality of antennae includes:
a first antenna element and a second antenna element that are in a first direction,
a first receiver that receives the first wireless signal via the first antenna element, and
a second receiver that receives the second wireless signal via the second antenna element; and
estimating carrier-related information of at least one of the first wireless signal or the second wireless signal that are controlled on a satellite side, based on the acquired reception results, wherein
among the plurality of antennae, a first antenna adjacent to a second antenna in a second direction perpendicular to the first direction are such that the first antenna element in one of the first antenna or the second antenna is adjacent to the second antenna element in other of the first antenna or the second antenna in the second direction.

* * * * *